United States Patent
Zhao et al.

(10) Patent No.: US 10,075,027 B2
(45) Date of Patent: Sep. 11, 2018

(54) METHOD AND DEVICE FOR ENABLING NEAR FIELD COMMUNICATION NFC WIRELESS CHARGING SERVICE

(71) Applicant: Huawei Device (Dongguan) Co., Ltd., Dongguan (CN)

(72) Inventors: Xiaona Zhao, Beijing (CN); Xinmiao Chang, Beijing (CN)

(73) Assignee: Huawei Device (Dongguan) Co., Ltd., Dongguan (CN)

( * ) Notice: Subject to any disclaimer, the term of this patent is extended or adjusted under 35 U.S.C. 154(b) by 59 days.

(21) Appl. No.: 15/111,770

(22) PCT Filed: Jan. 14, 2014

(86) PCT No.: PCT/CN2014/070615
§ 371 (c)(1),
(2) Date: Jul. 14, 2016

(87) PCT Pub. No.: WO2015/106392
PCT Pub. Date: Jul. 23, 2015

(65) Prior Publication Data
US 2016/0336787 A1    Nov. 17, 2016

(51) Int. Cl.
| | | |
|---|---|---|
| H02J 7/00 | (2006.01) | |
| H02J 50/80 | (2016.01) | |
| H02J 50/00 | (2016.01) | |
| H02J 50/90 | (2016.01) | |
| H02J 50/10 | (2016.01) | |
| H02J 7/02 | (2016.01) | |

(52) U.S. Cl.
CPC ............. *H02J 50/80* (2016.02); *H02J 7/025* (2013.01); *H02J 50/00* (2016.02); *H02J 50/10* (2016.02); *H02J 50/90* (2016.02)

(58) Field of Classification Search
CPC .. H02J 50/80; H02J 50/90; H02J 50/00; H02J 50/10; H02J 7/025
USPC ............... 320/106, 108, 103; 455/41.1, 573; 307/104
See application file for complete search history.

(56) References Cited

U.S. PATENT DOCUMENTS

| | | | |
|---|---|---|---|
| 8,213,862 B2 | 7/2012 | Muth | |
| 8,718,558 B2 * | 5/2014 | Montemurro | H04W 76/16 455/41.2 |
| 8,958,745 B2 * | 2/2015 | Kim | H04W 4/80 455/41.1 |

(Continued)

FOREIGN PATENT DOCUMENTS

| | | |
|---|---|---|
| CN | 101728859 A | 6/2010 |
| CN | 101777676 A | 7/2010 |

(Continued)

*Primary Examiner* — M'Baye Diao
(74) *Attorney, Agent, or Firm* — Slater Matsil, LLP

(57) ABSTRACT

A method includes determining, by a first electronic device, whether a charging party is the first electronic device or a second electronic device according to charging reference information. The method also includes enabling, in response to a determination that the charging party is the first electronic device, an NFC wireless charging service of the first electronic device. The method further includes instructing, by the first electronic device, the second electronic device to enable an NFC wireless charging service in response to a determination that the charging party is the second electronic device.

20 Claims, 5 Drawing Sheets

(56) References Cited

U.S. PATENT DOCUMENTS

| | | | |
|---|---|---|---|
| 8,995,911 B2* | 3/2015 | Nousiainen | H04W 84/18 455/41.1 |
| 9,258,380 B2* | 2/2016 | Ma | H04L 67/2814 |
| 9,692,250 B2* | 6/2017 | Priev | H02J 7/0027 |
| 2007/0103110 A1 | 5/2007 | Sagoo | |
| 2008/0315826 A1* | 12/2008 | Alberth, Jr. | H02J 7/0013 320/101 |
| 2009/0251008 A1 | 10/2009 | Sugaya | |
| 2010/0194335 A1 | 8/2010 | Kirby et al. | |
| 2011/0050164 A1* | 3/2011 | Partovi | H01F 5/003 320/108 |
| 2011/0221389 A1 | 9/2011 | Won et al. | |
| 2011/0221390 A1 | 9/2011 | Won et al. | |
| 2011/0225073 A1 | 9/2011 | Won et al. | |
| 2012/0220220 A1* | 8/2012 | DeLuca | H04M 1/72527 455/41.1 |
| 2012/0266001 A1 | 10/2012 | Sha et al. | |
| 2012/0280650 A1 | 11/2012 | Kim et al. | |
| 2013/0097233 A1* | 4/2013 | Raman | G06Q 10/10 709/204 |
| 2013/0214743 A1 | 8/2013 | Vorenkamp et al. | |
| 2013/0234658 A1 | 9/2013 | Endo et al. | |
| 2014/0361735 A1* | 12/2014 | Li | H02J 7/025 320/108 |
| 2014/0366123 A1* | 12/2014 | DiBona | G06F 21/60 726/16 |
| 2015/0244201 A1* | 8/2015 | Chu | H02J 7/025 320/108 |
| 2015/0245186 A1* | 8/2015 | Park | H04W 4/80 455/417 |
| 2015/0268742 A1* | 9/2015 | Park | G06F 3/03545 345/179 |
| 2015/0379322 A1* | 12/2015 | Yoon | G06F 21/445 382/124 |
| 2016/0028669 A1* | 1/2016 | Lee | H04L 51/16 715/752 |
| 2016/0063124 A1* | 3/2016 | Lee | G06F 17/30867 707/731 |
| 2016/0173492 A1* | 6/2016 | Han | H04L 63/0861 705/16 |
| 2016/0242033 A1* | 8/2016 | Jung | H04W 12/06 |
| 2016/0372976 A1* | 12/2016 | Shimura | H02J 7/025 |
| 2017/0004665 A1* | 1/2017 | Chang | G07C 9/00111 |
| 2017/0142589 A1* | 5/2017 | Park | H04W 12/08 |
| 2017/0193295 A1* | 7/2017 | Kim | G06K 9/00604 |
| 2017/0249791 A1* | 8/2017 | Woo | G07C 9/00111 |

FOREIGN PATENT DOCUMENTS

| | | |
|---|---|---|
| CN | 201663491 U | 12/2010 |
| CN | 102097848 A | 6/2011 |
| CN | 102780515 A | 11/2012 |
| CN | 102812618 A | 12/2012 |
| CN | 103094965 A | 5/2013 |
| JP | 2003029884 A | 1/2003 |
| JP | 2003029885 A | 1/2003 |
| JP | 2007124890 A | 5/2007 |
| JP | 2007185034 A | 7/2007 |
| JP | 2009251895 A | 10/2009 |
| JP | 2010028916 A | 2/2010 |
| JP | 2012520057 A | 8/2012 |
| JP | 2013523070 A | 6/2013 |
| JP | 2013526240 A | 6/2013 |
| JP | 2013191913 A | 9/2013 |

* cited by examiner

METHOD AND DEVICE FOR ENABLING NEAR FIELD COMMUNICATION NFC WIRELESS CHARGING SERVICE

CROSS-REFERENCE TO RELATED APPLICATIONS

This patent application is a national phase filing under section 371 of PCT/CN2014/070615, filed on Jan. 14, 2014, which application is hereby incorporated herein by reference.

TECHNICAL FIELD

The present invention relates to the field of wireless charging technologies, and in particular embodiments, to a method and device for enabling a near field communication NFC wireless charging service.

BACKGROUND

With continuous increase and diversification of electronic devices, people increasingly wish to remove numerous disorderly charging cables, and under the impetus of this wish, wireless charging technologies increasingly mature.

In the prior art, before performing NFC (Near Field Communication) wireless charging, a user needs to manually enable a wireless charging function of an electronic device that provides a charging service, and place the to-be-charged electronic device within an effective range of NFC communication, and then the electronic device providing the charging service begins a wireless charging process by using NFC communication.

It can be known from above, NFC wireless charging can be performed only in a case in which a user has a very definite charging purpose and manually enables an NFC wireless charging function of an electronic device providing a charging service, and therefore when NFC wireless charging stops midway (for example, the to-be-charged electronic device leaves an effective range of wireless charging), if the user needs to continue charging, the user can but manually enable again the NFC wireless charging function of the electronic device providing the charging service, which makes user operations troublesome, and deteriorates user experience.

SUMMARY

The present invention provides a method and device for enabling NFC wireless charging, which can automatically enable an NFC wireless charging service of an electronic device providing power.

A first aspect of the present invention provides a method for enabling an NFC wireless charging service, where the method includes the following. Determining, by a first electronic device, whether a charging party is the first electronic device or a second electronic device according to charging reference information. If it is determined that the charging party is the first electronic device, enabling an NFC wireless charging service of the first electronic device, so as to prepare to charge the second electronic device; or if the charging party is the second electronic device, instructing the second electronic device to enable an NFC wireless charging service, so as to prepare to charge the first electronic device.

In a first possible implementation manner of the first aspect, before the determining, by a first electronic device, whether a charging party is the first electronic device or a second electronic device according to charging reference information, the method includes: determining that the first electronic device and the second electronic device are kept within an effective distance of NFC communication and a time in which no NFC communication occurs between the both electronic devices exceeds a preset time threshold.

With reference to the first aspect or the first possible implementation manner, in a second possible implementation manner, the charging reference information includes: charging status information of the first electronic device and charging status information of the second electronic device. The determining, by a first electronic device, whether a charging party is the first electronic device or a second electronic device according to charging reference information includes the following. If it is determined according to the charging status information of the first electronic device that the first electronic device is not in a state of receiving power and it is determined according to the charging status information of the second electronic device that the second electronic device is in the state of receiving power, determining that the second electronic device is the charging party; or if it is determined according to the charging status information of the first electronic device that the first electronic device is in a state of receiving power and it is determined according to the charging status information of the second electronic device that the second electronic device is not in the state of receiving power, determining that the first electronic device is the charging party.

With reference to the first aspect or the first possible implementation manner, in a third possible implementation manner, the charging reference information includes: output power information of the first electronic device, charging status information of the first electronic device and charging status information of the second electronic device. The determining, by a first electronic device, whether a charging party is the first electronic device or a second electronic device according to charging reference information includes the following. If it is determined according to the output power information of the first electronic device that an output power value of the first electronic device is greater than or equal to a preset power threshold, or an output power level of the first electronic device is higher than or equal to a preset power level, it is determined according to the charging status information of the first electronic device that the first electronic device is in a state of receiving power, and it is determined according to the charging status information of the second electronic device that the second electronic device is not in the state of receiving power, determining that the first electronic device is the charging party.

With reference to the first aspect or the first possible implementation manner, in a fourth possible implementation manner, the charging reference information includes: output power information of the first electronic device and residual electric quantity information of the first electronic device. The determining, by a first electronic device, whether a charging party is the first electronic device or a second electronic device according to charging reference information includes the following. If it is determined according to the output power information of the first electronic device that an output power value of the first electronic device is greater than or equal to a preset power threshold, or an output power level of the first electronic device is higher than or equal to a preset power level, and it is determined according to the residual electric quantity information of the first electronic device that a residual electric quantity value of the first electronic device is greater than or equal to a first electric quantity threshold, determining that the first electronic device is the charging party, where the first electric quantity threshold includes a preset electric quantity threshold, or an electric quantity threshold that is set by the first electronic device according to residual electric quantity information of the both electronic devices.

With reference to the first aspect or the first possible implementation manner, in a fifth possible implementation manner, the charging reference information includes: output power information of the first electronic device, output power information of the second electronic device, charging status information of the first electronic device and charging status information of the second electronic device. The determining, by a first electronic device, whether a charging party is the first electronic device or a second electronic device according to charging reference information includes the following. If it is determined according to the output power information of the both electronic devices that the first electronic device is an electronic device whose output power is larger and it is determined according to the charging status information of the second electronic device that the second electronic device is not in a state of receiving power, determining that the first electronic device is the charging party. If it is determined according to the output power information of the both electronic devices that the second electronic device is an electronic device whose output power is larger and it is determined according to the charging status information of the first electronic device that the first electronic device is not in a state of receiving power, determining that the second electronic device is the charging party.

With reference to the first aspect or the first possible implementation manner, in a sixth possible implementation manner, the charging reference information includes: output power information of the first electronic device, output power information of the second electronic device, residual electric quantity information of the first electronic device and residual electric quantity information of the second electronic device. The determining, by a first electronic device, whether a charging party is the first electronic device or a second electronic device according to charging reference information includes the following. If it is determined according to the output power information of the both electronic devices that the first electronic device is an electronic device whose output power is larger and it is determined according to the residual electric quantity information of the first electronic device that a residual electric quantity value of the first electronic device is greater than or equal to a first electric quantity threshold, determining that the first electronic device is the charging party. If it is determined according to the output power information of the both electronic devices that the second electronic device is an electronic device whose output power is larger and it is determined according to the residual electric quantity information of the second electronic device that a residual electric quantity value of the second electronic device is greater than or equal to a second electric quantity threshold, determining that the second electronic device is the charging party, where the first electric quantity threshold includes a preset electric quantity threshold, or an electric quantity threshold that is set by the first electronic device according to residual electric quantity information of the both electronic devices. The second electric quantity threshold includes a preset electric quantity threshold, or an electric quantity threshold that is set by the first electronic device according to residual electric quantity information of the both electronic devices.

With reference to the first aspect or the first possible implementation manner, in a seventh possible implementation manner, the charging reference information includes: charging status information of the first electronic device, charging status information of the second electronic device, output power information of the first electronic device, output power information of the second electronic device, and residual electric quantity information of the first electronic device and/or the second electronic device. The determining, by a first electronic device, whether a charging party is the first electronic device or a second electronic device according to charging reference information includes the following. If it is determined according to the charging status information of the both electronic devices that neither of the both electronic devices is in a state of receiving power, it is determined according to the output power information of the both electronic devices that the first electronic device is an electronic device whose output power is larger, and it is determined according to the residual electric quantity information of the first electronic device that a residual electric quantity value of the first electronic device is greater than or equal to a first electric quantity threshold, determining that the first electronic device is the charging party. If it is determined according to the charging status information of the both electronic devices that only the first electronic device is in a state of receiving power, and it is determined according to the output power information of the both electronic devices that the first electronic device is an electronic device whose output power is larger, determining that the first electronic device is the charging party. If it is determined according to the charging status information of the both electronic devices that neither of the both electronic devices is in a state of receiving power, it is determined according to the output power information of the both electronic devices that the second electronic device is an electronic device whose output power is larger, and it is determined according to the charging status information of the second electronic device that a residual electric quantity value of the second electronic device is greater than or equal to a second electric quantity threshold, determining that the second electronic device is the charging party. If it is determined according to the charging status information of the both electronic devices that only the second electronic device is in a state of receiving power, and it is determined according to the output power information of the both electronic devices that the second electronic device is an electronic device whose output power is larger, determining that the second electronic device is the charging party, where the first electric quantity threshold includes a preset electric quantity threshold, or an electric quantity threshold that is set by the first electronic device according to residual electric quantity information of the both electronic devices. The second electric quantity threshold includes a preset electric quantity threshold, or an electric quantity threshold that is set by the first electronic device according to residual electric quantity information of the both electronic devices.

With reference to any possible implementation manner of the fifth possible implementation manner to the seventh possible implementation manner, in an eighth possible implementation manner, the electronic device whose output power is larger includes: an electronic device whose output power level is higher, and/or an electronic device whose output power value is larger when an absolute value of a difference between output power values of the both electronic devices is greater than or equal to a preset power difference threshold.

A second aspect of the present invention provides another method for enabling a near field communication NFC wireless charging service, where the method includes the following. Receiving, by a second electronic device, a notification sent by a first electronic device when the first electronic device determines that the second electronic device is a charging party, and enabling an NFC wireless charging service of the second electronic device according to the notification, so as to prepare to charge the first electronic device; or receiving, by the second electronic device, a charging control message sent by the first electronic device when the first electronic device determines that the first electronic device serves as the charging party, so as to instruct the second electronic device to respond as a charged party.

In a first possible implementation manner of the second aspect, before the receiving, by a second electronic device, a notification sent by a first electronic device when the first electronic device determines that the second electronic device is a charging party, the method further includes:

sending at least one piece of charging status information of the second electronic device, output power information of the second electronic device and residual electric quantity information of the second electronic device to the first electronic device; or receiving a request message of the first electronic device, and sending at least one piece of charging status information of the second electronic device, output power information of the second electronic device and residual electric quantity information of the second electronic device to the first electronic device according to the request message of the first electronic device; and before the receiving, by the second electronic device, a charging control message sent by the first electronic device when the first electronic device determines that the first electronic device serves as the charging party, the method further includes:

sending at least one piece of charging status information of the second electronic device, output power information of the second electronic device and residual electric quantity information of the second electronic device to the first electronic device; or receiving a request message of the first electronic device, and sending at least one piece of charging status information of the second electronic device, output power information of the second electronic device and residual electric quantity information of the second electronic device to the first electronic device according to the request message of the first electronic device.

With reference to the first possible implementation manner, in a second possible implementation manner, before the sending at least one piece of charging status information of the second electronic device, output power information of the second electronic device and residual electric quantity information of the second electronic device to the first electronic device, the method further includes:

determining that the second electronic device and the first electronic device are kept within an effective distance of NFC communication and a time in which no NFC communication occurs between the both electronic devices exceeds a preset time threshold.

A third aspect of the present invention provides an electronic device, including:

a processor, configured to determine whether the electronic device is a charging party or a second electronic device is a charging party according to charging reference information; and if it is determined that the electronic device is the charging party, control an NFC wireless charging controller to enable an NFC wireless charging service, so as to prepare to charge the second electronic device; or if it is determined that the second electronic device is the charging party, control a transceiver to send a notification to the second electronic device;

the NFC wireless charging controller, configured to enable the NFC wireless charging service according to control of the processor, so as to prepare to charge the second electronic device; and the transceiver, configured to send the notification to the second electronic device according to control of the processor, so that the second electronic device enables an NFC wireless charging service of the second electronic device according to the notification, and prepares to charge the electronic device.

In a first possible implementation manner of the third aspect, the processor is further configured to: before it is determined whether the electronic device is the charging party or the second electronic device is the charging party according to the charging reference information, determine that the electronic device and the second electronic device are kept within an effective distance of NFC communication and a time in which no NFC communication occurs between the both electronic devices exceeds a preset time threshold.

With reference to the third aspect or the first possible implementation manner, in a second possible implementation manner, the charging reference information includes: charging status information of the electronic device and charging status information of the second electronic device; and the processor is configured to:

if it is determined according to the charging status information of the electronic device that the electronic device is not in a state of receiving power and it is determined according to the charging status information of the second electronic device that the second electronic device is in the state of receiving power, determine that the second electronic device is the charging party; or if it is determined according to the charging status information of the electronic device that the electronic device is in a state of receiving power and it is determined according to the charging status information of the second electronic device that the second electronic device is not in the state of receiving power, determine that the electronic device is the charging party.

With reference to the third aspect or the first possible implementation manner, in a third possible implementation manner, the charging reference information includes: output power information of the electronic device, charging status information of the electronic device and charging status information of the second electronic device; and the processor is configured to:

if it is determined according to the output power information of the electronic device that an output power value of the electronic device is greater than or equal to a preset power threshold, or an output power level of the electronic device is higher than or equal to a preset power level, it is determined according to the charging status information of the electronic device that the electronic device is in a state of receiving power, and it is determined according to the charging status information of the second electronic device that the second electronic device is not in the state of receiving power, determine that the electronic device is the charging party.

With reference to the third aspect or the first possible implementation manner, in a fourth possible implementation manner, the charging reference information includes: output power information of the electronic device and residual electric quantity information of the electronic device; and the processor is configured to:

if it is determined according to the output power information of the electronic device that an output power value of the electronic device is greater than or equal to a preset power threshold, or an output power level of the electronic device is higher than or equal to a preset power level, and it is determined according to the residual electric quantity information of the electronic device that a residual electric quantity value of the electronic device is greater than or equal to a first electric quantity threshold, determine that the electronic device is the charging party, where the first electric quantity threshold includes a preset electric quantity threshold, or an electric quantity threshold that is set by the electronic device according to residual electric quantity information of the both electronic devices.

With reference to the third aspect or the first possible implementation manner, in a fifth possible implementation manner, the charging reference information includes: output power information of the electronic device, output power information of the second electronic device, charging status information of the electronic device and charging status information of the second electronic device; and the processor is configured to:

if it is determined according to the output power information of the both electronic devices that the electronic device is an electronic device whose output power is larger and it is determined according to the charging status information of the second electronic device that the second electronic device is not in a state of receiving power, determine that the electronic device is the charging party; or if it is determined according to the output power information of the both electronic devices that the second electronic device is an electronic device whose output power is larger and it is determined according to the charging status information of the electronic device that the electronic device is not in a state of receiving power, determine that the second electronic device is the charging party.

With reference to the third aspect or the first possible implementation manner, in a sixth possible implementation manner, the charging reference information includes: output power information of the electronic device, output power information of the second electronic device, residual electric quantity information of the electronic device and residual electric quantity information of the second electronic device; and the processor is configured to:

if it is determined according to the output power information of the both electronic devices that the electronic device is an electronic device whose output power is larger and it is determined according to the residual electric quantity information of the electronic device that a residual electric quantity value of the electronic device is greater than or equal to a first electric quantity threshold, determine that the electronic device is the charging party; or if it is determined according to the output power information of the both electronic devices that the second electronic device is an electronic device whose output power is larger and it is determined according to the residual electric quantity information of the second electronic device that a residual electric quantity value of the second electronic device is greater than or equal to a second electric quantity threshold, determine that the second electronic device is the charging party, where the first electric quantity threshold includes a preset electric quantity threshold, or an electric quantity threshold that is set by the electronic device according to residual electric quantity information of the both electronic devices; and the second electric quantity threshold includes a preset electric quantity threshold, or an electric quantity threshold that is set by the electronic device according to residual electric quantity information of the both electronic devices.

With reference to the third aspect or the first possible implementation manner, in a seventh possible implementation manner, the charging reference information includes: charging status information of the electronic device, charging status information of the second electronic device, output power information of the electronic device, output power information of the second electronic device, and residual electric quantity information of the electronic device and/or the second electronic device; and the processor is configured to:

if it is determined according to the charging status information of the both electronic devices that neither of the both electronic devices is in a state of receiving power, it is determined according to the output power information of the both electronic devices that the electronic device is an electronic device whose output power is larger, and it is determined according to the residual electric quantity information of the electronic device that a residual electric quantity value of the electronic device is greater than or equal to a first electric quantity threshold, determine that the electronic device is the charging party;

if it is determined according to the charging status information of the both electronic devices that only the electronic device is in a state of receiving power, and it is determined according to the output power information of the both electronic devices that the electronic device is an electronic device whose output power is larger, determine that the electronic device is the charging party;

if it is determined according to the charging status information of the both electronic devices that neither of the both electronic devices is in a state of receiving power, it is determined according to the output power information of the both electronic devices that the second electronic device is an electronic device whose output power is larger, and it is determined according to the charging status information of the second electronic device that a residual electric quantity value of the second electronic device is greater than or equal to a second electric quantity threshold, determine that the second electronic device is the charging party; or if it is determined according to the charging status information of the both electronic devices that only the second electronic device is in a state of receiving power, and it is determined according to the output power information of the both electronic devices that the second electronic device is an electronic device whose output power is larger, determine that the second electronic device is the charging party, where the first electric quantity threshold includes a preset electric quantity threshold, or an electric quantity threshold that is set by the electronic device according to residual electric quantity information of the both electronic devices; and the second electric quantity threshold includes a preset electric quantity threshold, or an electric quantity threshold that is set by the electronic device according to residual electric quantity information of the both electronic devices.

With reference to any possible implementation manner of the fifth possible implementation manner to the seventh possible implementation manner, in an eighth possible implementation manner, the electronic device whose output power is larger includes: an electronic device whose output power level is higher, and/or an electronic device whose output power value is larger when an absolute value of a difference between output power values of the both electronic devices is greater than or equal to a preset power difference threshold.

A fourth aspect of the present invention provides an electronic device, including:

a transceiver, configured to receive a notification sent by a first electronic device when the first electronic device determines that the electronic device is a charging party;

a processor, configured to control an NFC wireless charging controller according to the notification received by the transceiver, so as to enable an NFC wireless charging service of the electronic device; and the NFC wireless charging controller, configured to enable the NFC wireless charging service according to control of the processor, so as to prepare to charge the first electronic device; or the transceiver, configured to receive a charging control message sent by the first electronic device when the first electronic device determines that the first electronic device is a charging party; and the processor, configured to instruct, according to the charging control message received by the transceiver, the electronic device to respond as a charged party.

In a first possible implementation manner of the fourth aspect, the transceiver is further configured to: before the notification is received, send at least one piece of charging status information of the electronic device, output power information of the electronic device and residual electric quantity information of the electronic device to the first electronic device; or receive a request message of the first electronic device, and send at least one piece of charging status information of the electronic device, output power information of the electronic device and residual electric quantity information of the electronic device to the first electronic device according to the request message of the first electronic device; and the transceiver is further configured to: before the charging control message is received, send at least one piece of charging status information of the electronic device, output power information of the electronic device and residual electric quantity information of the electronic device to the first electronic device; or receive a request message of the first electronic device, and send at least one piece of charging status information of the electronic device, output power information of the electronic device and residual electric quantity information of the electronic device to the first electronic device according to the request message of the first electronic device.

With reference to the first possible implementation manner, in a second possible implementation manner, the processor is further configured to: before the transceiver sends at least one piece of the charging status information of the electronic device, the output power information of the electronic device and the residual electric quantity information of the electronic device to the first electronic device, determine that the electronic device and the first electronic device are kept within an effective distance of NFC communication and a time in which no NFC communication occurs between the both electronic devices exceeds a preset time threshold.

A fifth aspect of the present invention provides an electronic device, including:

a processing unit, configured to determine whether a charging party is the electronic device or a second electronic device according to charging reference information, and when it is determined that the charging party is the electronic device, enable an NFC wireless charging service of the electronic device, so as to prepare to charge the second electronic device; and a sending unit, configured to: when the processing unit determines that the charging party is the second electronic device, instruct the second electronic device to enable an NFC wireless charging service, so as to prepare to charge the electronic device.

In a first possible implementation manner of the fifth aspect, the processing unit is further configured to: before it is determined whether the charging party is the electronic device or the second electronic device according to the charging reference information, determine that the electronic device and the second electronic device are kept within an effective distance of NFC communication and a time in which no NFC communication occurs between the both electronic devices exceeds a preset time threshold.

With reference to the fifth aspect or the first possible implementation manner, in a second possible implementation manner, the charging reference information includes: charging status information of the electronic device and charging status information of the second electronic device; and the processing unit is further configured to:

if it is determined according to the charging status information of the electronic device that the electronic device is not in a state of receiving power and it is determined according to the charging status information of the second electronic device that the second electronic device is in the state of receiving power, determine that the second electronic device is the charging party; or if it is determined according to the charging status information of the electronic device that the electronic device is in a state of receiving power and it is determined according to the charging status information of the second electronic device that the second electronic device is not in the state of receiving power, determine that the electronic device is the charging party.

With reference to the fifth aspect or the first possible implementation manner, in a third possible implementation manner, the charging reference information includes: output power information of the electronic device, charging status information of the electronic device and charging status information of the second electronic device; and the processing unit is configured to:

if it is determined according to the output power information of the electronic device that an output power value of the electronic device is greater than or equal to a preset power threshold, or an output power level of the electronic device is higher than or equal to a preset power level, it is determined according to the charging status information of the electronic device that the electronic device is in a state of receiving power, and it is determined according to the charging status information of the second electronic device that the second electronic device is not in the state of receiving power, determine that the electronic device is the charging party.

With reference to the fifth aspect or the first possible implementation manner, in a fourth possible implementation manner, the charging reference information includes: output power information of the electronic device and residual electric quantity information of the electronic device; and the processing unit is configured to:

if it is determined according to the output power information of the electronic device that an output power value of the electronic device is greater than or equal to a preset power threshold, or an output power level of the electronic device is higher than or equal to a preset power level, and it is determined according to the residual electric quantity information of the electronic device that a residual electric quantity value of the electronic device is greater than or equal to a first electric quantity threshold, determine that the electronic device is the charging party, where the first electric quantity threshold includes a preset electric quantity threshold, or an electric quantity threshold that is set by the electronic device according to residual electric quantity information of the both electronic devices.

With reference to the fifth aspect or the first possible implementation manner, in a fifth possible implementation manner, the charging reference information includes: output power information of the electronic device, output power information of the second electronic device, charging status information of the electronic device and charging status information of the second electronic device; and the processing unit is configured to:

if it is determined according to the output power information of the both electronic devices that the electronic device is an electronic device whose output power is larger and it is determined according to the charging status information of the second electronic device that the second electronic device is not in a state of receiving power, determine that the electronic device is the charging party; or if it is determined according to the output power information of the both electronic devices that the second electronic device is an electronic device whose output power is larger and it is determined according to the charging status information of the electronic device that the electronic device is not in a state of receiving power, determine that the second electronic device is the charging party.

With reference to the fifth aspect or the first possible implementation manner, in a sixth possible implementation manner, the charging reference information includes: output power information of the electronic device, output power information of the second electronic device, residual electric quantity information of the electronic device and residual electric quantity information of the second electronic device; and the processing unit is configured to:

if it is determined according to the output power information of the both electronic devices that the electronic device is an electronic device whose output power is larger and it is determined according to the residual electric quantity information of the electronic device that a residual electric quantity value of the electronic device is greater than or equal to a first electric quantity threshold, determine that the electronic device is the charging party; or if it is determined according to the output power information of the both electronic devices that the second electronic device is an electronic device whose output power is larger and it is determined according to the residual electric quantity information of the second electronic device that a residual electric quantity value of the second electronic device is greater than or equal to a second electric quantity threshold, determine that the second electronic device is the charging party, where the first electric quantity threshold includes a preset electric quantity threshold, or an electric quantity threshold that is set by the electronic device according to residual electric quantity information of the both electronic devices; and the second electric quantity threshold includes a preset electric quantity threshold, or an electric quantity threshold that is set by the electronic device according to residual electric quantity information of the both electronic devices.

With reference to the fifth aspect or the first possible implementation manner, in a seventh possible implementation manner, the charging reference information includes: charging status information of the electronic device, charging status information of the second electronic device, output power information of the electronic device, output power information of the second electronic device, and residual electric quantity information of the electronic device and/or the second electronic device; and the processing unit is configured to:

if it is determined according to the charging status information of the both electronic devices that neither of the both electronic devices is in a state of receiving power, it is determined according to the output power information of the both electronic devices that the electronic device is an electronic device whose output power is larger, and it is determined according to the residual electric quantity information of the electronic device that a residual electric quantity value of the electronic device is greater than or equal to a first electric quantity threshold, determine that the electronic device is the charging party;

if it is determined according to the charging status information of the both electronic devices that only the electronic device is in a state of receiving power, and it is determined according to the output power information of the both electronic devices that the electronic device is an electronic device whose output power is larger, determine that the electronic device is the charging party;

if it is determined according to the charging status information of the both electronic devices that neither of the both electronic devices is in a state of receiving power, it is determined according to the output power information of the both electronic devices that the second electronic device is an electronic device whose output power is larger, and it is determined according to the charging status information of the second electronic device that a residual electric quantity value of the second electronic device is greater than or equal to a second electric quantity threshold, determine that the second electronic device is the charging party; or if it is determined according to the charging status information of the both electronic devices that only the second electronic device is in a state of receiving power, and it is determined according to the output power information of the both electronic devices that the second electronic device is an electronic device whose output power is larger, determine that the second electronic device is the charging party, where the first electric quantity threshold includes a preset electric quantity threshold, or an electric quantity threshold that is set by the electronic device according to residual electric quantity information of the both electronic devices; and the second electric quantity threshold includes a preset electric quantity threshold, or an electric quantity threshold that is set by the electronic device according to residual electric quantity information of the both electronic devices.

With reference to any possible implementation manner of the fifth possible implementation manner to the seventh possible implementation manner, in an eighth possible implementation manner, an electronic device whose output power level is higher, and/or an electronic device whose output power value is larger when an absolute value of a difference between output power values of the both electronic devices is greater than or equal to a preset power difference threshold.

A sixth aspect of the present invention provides an electronic device, including:

a receiving unit, configured to receive a notification sent by a first electronic device when the first electronic device determines that the electronic device is a charging party; and a processing unit, configured to enable an NFC wireless charging service of the electronic device according to the notification received by the receiving unit, so as to prepare to charge the first electronic device; or the receiving unit, configured to receive a charging control message sent by the first electronic device when the first electronic device determines that the first electronic device is a charging party; and the processing unit, configured to instruct, according to the charging control message received by the receiving unit, the electronic device to respond as a charged party.

In a first possible implementation manner of the sixth aspect, the electronic device further includes a sending unit, where the sending unit is configured to: before the receiving unit receives the notification, send at least one piece of charging status information of the electronic device, output power information of the electronic device and residual electric quantity information of the electronic device to the first electronic device; or receive a request message of the first electronic device, and send at least one piece of charging status information of the electronic device, output power information of the electronic device and residual electric quantity information of the electronic device to the first electronic device according to the request message of the first electronic device; and the sending unit is further configured to: before the receiving unit receives the charging control message, send at least one piece of charging status information of the electronic device, output power information of the electronic device and residual electric quantity information of the electronic device to the first electronic device; or receive a request message of the first electronic device, and send at least one piece of charging status information of the electronic device, output power information of the electronic device and residual electric quantity information of the electronic device to the first electronic device according to the request message of the first electronic device.

With reference to the first possible implementation manner, in a second possible implementation manner, the processing unit is further configured to: before the sending unit sends at least one piece of the charging status information of the electronic device, the output power information of the electronic device and the residual electric quantity information of the electronic device to the first electronic device, determine that the electronic device and the first electronic device are kept within an effective distance of NFC communication and a time in which no NFC communication occurs between the both electronic devices exceeds a preset time threshold.

By using the foregoing solutions, a first electronic device determines whether a charging party is the first electronic device or a second electronic device according to charging reference information, and when it is determined that the charging party is the first electronic device, the first electronic device enables an NFC wireless charging service of the first electronic device, or when it is determined that the charging party is the second electronic device, the first electronic device instructs the second electronic device to enable an NFC wireless charging service. In this way, when the first electronic device and the second electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

The following clearly describes the technical solutions in the embodiments of the present invention with reference to the accompanying drawings in the embodiments of the present invention. Apparently, the described embodiments are merely some but not all of the embodiments of the present invention. All other embodiments obtained by a person of ordinary skill in the art based on the embodiments of the present invention without creative efforts shall fall within the protection scope of the present invention.

Figure 1:
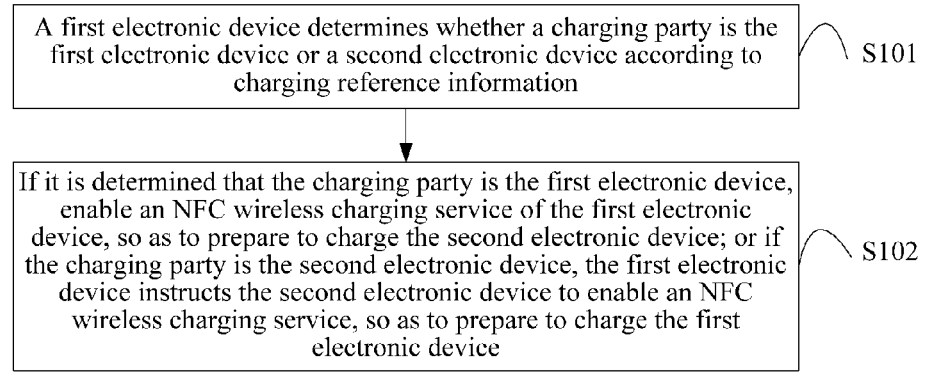
FIG. 1 is a schematic flowchart of a method for enabling an NFC wireless charging service according to an embodiment of the present invention.

An embodiment of the present invention provides a method for enabling an NFC wireless charging service. As shown in FIG. 1, the method includes the following.

S101: A first electronic device determines whether a charging party is the first electronic device or a second electronic device according to charging reference information.

It should be noted that, the first electronic device may be a mobile phone, a tablet computer, a notebook computer or the like, the second electronic device may be a Bluetooth headset, a pedometer, a mobile phone or the like, and both the first electronic device and the second electronic device have an NFC communication function.

Specifically, before the determining, by a first electronic device, whether a charging party is the first electronic device or a second electronic device according to charging reference information, the first electronic device determines that the first electronic device and the second electronic device are kept within an effective distance of NFC communication and a time in which no NFC communication occurs between the both electronic devices exceeds a preset time threshold.

Additionally, the charging reference information includes information actively sent by the second electronic device to the first electronic device or information sent by the second electronic device to the first electronic device according to a request message of the first electronic device. The first electronic device may obtain the charging reference information by sending the request message for multiple times or at one time, which is not limited in the present invention.

If information included in the charging reference information differs, a manner implemented in step S101 also differs, and specifically includes the following.

Manner 1: The charging reference information includes: charging status information of the first electronic device and charging status information of the second electronic device.

Then, the first electronic device makes determining according to the charging reference information as follows:

1) When the first electronic device is not in a state of receiving power and the second electronic device is in the state of receiving power, it is determined that the second electronic device is the charging party;

2) When the first electronic device is in a state of receiving power and the second electronic device is not in the state of receiving power, it is determined that the first electronic device is the charging party;

3) When the first electronic device is not in a state of receiving power and the second electronic device is not in the state of receiving power, it may be randomly determined whether the first electronic device or the second electronic device is the charging party, or the entire process may end, or it may be determined by obtaining output power information, residual electric quantity information and the like of the first electronic device and the second electronic device whether the first electronic device or the second electronic device serves as the charging party (for details, refer to the following related implementation manner); or 4) When the first electronic device is in a state of receiving power and the second electronic device is in the state of receiving power, the entire process is terminated.

Specifically, the charging status information includes a charging identifier that is used for denoting whether a corresponding electronic device is in a state of receiving power, and then when one electronic device is in the state of receiving power, and the other electronic device is not in the state of receiving power, the first electronic device determines that an electronic device being in the state of receiving power is the charging party, and enables an NFC wireless charging service of the charging party, so as to prepare to charge the peer electronic device. When neither of the both electronic devices is in the state of receiving power, the first electronic device may randomly determine that one electronic device is the charging party, or it may be determined by obtaining output power information, residual electric quantity information and the like of the first electronic device and the second electronic device whether the first electronic device or the second electronic device serves as the charging party (for details, refer to the following related implementation manner). When the both electronic devices are in the state of receiving power, the entire process is terminated.

Manner 2: The charging reference information includes: output power information of the first electronic device.

Then, the first electronic device makes determining according to the charging reference information as follows:

1) When an output power value of the first electronic device is greater than or equal to a preset power threshold, or an output power level is higher than or equal to a preset power level, it is determined that the first electronic device is the charging party; or 2) When an output power of the first electronic device is less than a preset power threshold, it may be determined that the second electronic device is the charging party, or it may be determined by obtaining an output power of the second electronic device and/or charging status information of the both parties and/or residual electric quantity information of the both parties whether the first electronic device or the second electronic device serves as the charging party (for details, refer to the following related implementation manner).

Specifically, the output power information may include an output power value, and then the preset power threshold is a threshold value that is preset according to an actual situation; and the output power information may include an output power level, and then the preset power level is a threshold level that is preset according to an actual situation. For example, when the output power of the first electronic device is sufficiently large (for example, the first electronic device is a high-power device), the first electronic device may be the charging party by default.

Manner 3: The charging reference information includes: output power information of the first electronic device and output power information of the second electronic device.

Then, the first electronic device makes determining according to the charging reference information as follows:

1) When the first electronic device is an electronic device whose output power is larger, it is determined that the first electronic device is the charging party;

2) When the second electronic device is an electronic device whose output power is larger, it is determined that the second electronic device is the charging party; or 3) When the first electronic device and the second electronic device are electronic devices whose output powers are equivalent, it may be randomly determined that one electronic device is the charging party, or the entire process may end, or it may be determined by obtaining charging status information of the both electronic devices and/or residual electric quantity information of the first electronic device or the both electronic devices whether the first electronic device or the second electronic device serves as the charging party (for details, refer to the following related implementation manner).

Specifically, the output power information may include output power levels, such as a high level, an intermediate level, and a low level, and in this case, the first electronic device determines an electronic device whose output power is larger by comparing output power levels of the both electronic devices, and determines that the electronic device whose output power is larger is the charging party, for example, when the output power levels of the both electronic devices at least differ by one level, an electronic device whose level is large is the electronic device whose output power is larger. The output power information may also include an output power value, and in this case, when determining that a difference between output power values of the both electronic devices is greater than a preset power difference threshold, the first electronic device determines that an electronic device whose output power value is larger is the charging party, for example, an output power value of the first electronic device and an output power value of the second electronic device are P1 and P2 respectively, and the preset power difference threshold is $\Delta P$, and therefore if P1>P2 and |P1−P2|>ΔP, the first electronic device is the electronic device whose output power is larger.

It should be noted that, the output power information may include both an output power level and an output power value, and then when output power levels of the both electronic devices are the same, the first electronic device may determine the electronic device whose output power is larger by using the foregoing method, that is, by comparing the difference between the output power values of the both electronic devices with the preset power difference threshold. Additionally, the first electronic device may indirectly obtain the output power value by obtaining an output current and an output voltage.

Manner 4: The charging reference information includes: output power information of the first electronic device, charging status information of the first electronic device and/or charging status information of the second electronic device.

Then, the first electronic device makes determining according to the charging reference information as follows:

1) When an output power value of the first electronic device is greater than or equal to a preset power threshold, or an output power level is higher than or equal to a preset power level, and the first electronic device is in a state of receiving power and/or the second electronic device is not in the state of receiving power, it is determined that the first electronic device is the charging party;

2) When an output power value of the first electronic device is greater than or equal to a preset power threshold, or an output power level is higher than or equal to a preset power level, and the second electronic device is in a state of receiving power, it may be determined that the second electronic device is the charging party, or the entire process may end;

3) When an output power value of the first electronic device is less than a preset power threshold, or an output power level is lower than a preset power level, and the first electronic device is not in a state of receiving power, it may be determined that the second electronic device is the charging party, or the process may end, or it may be determined by obtaining output power information of the second electronic device and/or residual electric quantity information of the both electronic devices whether the first electronic device or the second electronic device serves as the charging party (for details, refer to other implementation manner); or 4) When an output power value of the first electronic device is less than a preset power threshold, or an output power level is lower than a preset power level, and the first electronic device is in a state of receiving power, it may be determined that the first electronic device is the charging party, or the process may end.

It should be noted that, functions of the charging status information, the output power information, the preset power threshold, and the preset power level that are described in this manner are the same as those in other related implementation manners described above, and details are not described herein again. Additionally, the first electronic device may first perform determining according to the output power information, or may first perform determining according to the charging status information of the both electronic devices, and a determining sequence of the information is not limited in this manner.

Manner 5: The charging reference information includes: output power information of the first electronic device, output power information of the second electronic device, charging status information of the first electronic device and charging status information of the second electronic device.

Then, the first electronic device makes determining according to the charging reference information as follows:

1) When the first electronic device is an electronic device whose output power is larger and the second electronic device is not in a state of receiving power, it is determined that the first electronic device is the charging party;

2) When the first electronic device is an electronic device whose output power is larger and the second electronic device is in a state of receiving power, it may be determined that the second electronic device is the charging party, or the entire process may end;

3) When the second electronic device is an electronic device whose output power is larger and the first electronic device is not in a state of receiving power, it is determined that the second electronic device is the charging party; or 4) When the second electronic device is an electronic device whose output power is larger and the first electronic device is in a state of receiving power, it may be determined that the first electronic device is the charging party, or the entire process may end.

It should be noted that, functions of the charging status information and the output power information that are described in this manner are the same as those in other related implementation manners described above, and details are not described herein again. For a method for determining the electronic device whose output power is larger, refer to specific description in Manner 3 described above, and details are not described herein again. Additionally, the first electronic device may first perform determining according to the output power information of the both electronic devices, or may first perform determining according to the charging status information of the both electronic devices, and a determining sequence of the information is not limited in this manner.

Manner 6: The charging reference information includes: charging status information of the first electronic device, charging status information of the second electronic device and residual electric quantity information of the first electronic device.

Then, the first electronic device makes determining according to the charging reference information as follows:

1) When a residual electric quantity value of the first electronic device is greater than or equal to a first electric quantity threshold, and the second electronic device is not in a state of receiving power, it is determined that the first electronic device is the charging party;

2) When a residual electric quantity value of the first electronic device is greater than or equal to a first electric quantity threshold, and the second electronic device is in a state of receiving power, it may be determined that the second electronic device is the charging party, or the entire process may end;

3) When a residual electric quantity value of the first electronic device is less than a first electric quantity threshold, and the first electronic device is in a state of receiving power, it may be determined that the first electronic device is the charging party, or the entire process may end; or 4) When a residual electric quantity value of the first electronic device is less than a first electric quantity threshold, and the first electronic device is not in a state of receiving power, it may be determined that the second electronic device is the charging party, or the entire process may end.

Specifically, the first electric quantity threshold may be a preset electric quantity threshold, or an electric quantity threshold that is set by the first electronic device according to residual electric quantity information of the both electronic devices after the first electronic device obtains residual electric quantity information of the second electronic device.

Exemplarily, the first electronic device sends a battery information request to the second electronic device, and receives a battery information response that is sent by the second electronic device according to the battery information request, where the battery information request is used for learning residual electric quantity information of a battery of the second electronic device, and then the first electronic device determines the first electric quantity threshold according to the residual electric quantity information of the both electronic devices.

It should be noted that, the residual electric quantity information includes a residual electric quantity value and/or a total battery quantity, and/or a residual electric quantity percentage and a total battery quantity, and the residual electric quantity information may further include a charging demand indication and/or other related parameters such as a maximum or threshold discharging current.

Exemplarily, a residual electric quantity value of the first electronic device is 500 mAh, a minimum electric quantity value affecting normal usage of a device is 300 mAh. If after sending a battery information request to the second electronic device, the first electronic device determines according to a battery information response sent by the second electronic device that a total battery quantity of the second electronic device is 150 mAh, and a residual electric quantity value of the second electronic device is 10 mAh, the first electronic device may set a first electric quantity threshold that can charge the second electronic device, such as, 400 mAh. If the first electronic device determines that the total battery quantity of the second electronic device is 2000 mAh, the residual electric quantity value of the second electronic device is 100 mAh, and a maximum discharging current of the second electronic device is 2 A, after the first electronic device charges the second electronic device by an electric quantity of 200 mAh, an estimated normal usage time of the second electronic device is about 10 minutes, and in this case, the first electronic device may set a first electric quantity threshold of 500 mAh for the second electronic device.

It should be noted that, a function of the charging status information that is described in this manner is the same as those in other related implementation manners described above, and details are not described herein again. Additionally, the first electronic device may first perform determining according to the residual electric quantity information of the first electronic device, or may first perform determining according to the charging status information of the both electronic devices, and a determining sequence of the information is not limited in this manner.

Manner 7: The charging reference information includes: output power information of the first electronic device and residual electric quantity information of the first electronic device.

Then, the first electronic device makes determining according to the charging reference information as follows:

1) When an output power value of the first electronic device is greater than or equal to a preset power threshold, or an output power level is higher than or equal to a preset power level, and a residual electric quantity value of the first electronic device is greater than or equal to a first electric quantity threshold, it is determined that the first electronic device is the charging party;

2) When an output power value of the first electronic device is greater than or equal to a preset power threshold, or an output power level is higher than or equal to a preset power level, and a residual electric quantity value of the first electronic device is less than a first electric quantity threshold, it may be determined that the second electronic device is the charging party, or the entire process may end, or it may be determined by obtaining charging statuses of the both electronic devices and/or a residual electric quantity of the second electronic device and/or output power information of the second electronic device whether the first electronic device or the second electronic device serves as the charging party (for details, refer to other related implementation manner);

3) When an output power value of the first electronic device is less than a preset power threshold, or an output power level is lower than a preset power level, and a residual electric quantity value of the first electronic device is greater than or equal to a first electric quantity threshold, it may be determined that the first electronic device is the charging party, or the entire process may end, or it may be determined by obtaining charging statuses of the both electronic devices and/or a residual electric quantity of the second electronic device and/or output power information of the second electronic device whether the first electronic device or the second electronic device serves as the charging party (for details, refer to other related implementation manner); or 4) When an output power value of the first electronic device is less than a preset power threshold, or an output power level is lower than a preset power level, and a residual electric quantity value of the first electronic device is less than a first electric quantity threshold, it may be determined that the second electronic device is the charging party, or the entire process may end, or it may be determined by obtaining charging statuses of the both electronic devices and/or a residual electric quantity of the second electronic device and/or output power information of the second electronic device whether the first electronic device or the second electronic device serves as the charging party (for details, refer to other related implementation manner).

It should be noted that, functions of the output power information, the preset power threshold, the preset power level, the residual electric quantity information, the first electric quantity threshold, and the charging status information that are described in this manner are the same as those in other related implementation manners described above, and details are not described herein again. Additionally, the first electronic device may first perform determining according to the output power information of the first electronic device, or may first perform determining according to the residual electric quantity information of the first electronic device, and a determining sequence of the information is not limited in this manner.

Manner 8: The charging reference information includes: output power information of the second electronic device, output power information of the first electronic device and residual electric quantity information of the first electronic device.

Then, the first electronic device makes determining according to the charging reference information as follows:

1) When the first electronic device is an electronic device whose output power is larger and a residual electric quantity value of the first electronic device is greater than or equal to a first electric quantity threshold, it is determined that the first electronic device is the charging party;

2) When the second electronic device is an electronic device whose output power is larger and a residual electric quantity value of the first electronic device is less than a first electric quantity threshold, it is determined that the second electronic device is the charging party;

3) When the first electronic device is an electronic device whose output power is larger and a residual electric quantity of the first electronic device is less than a first electric quantity threshold, it may be determined that the second electronic device is the charging party, or the entire process may end, or it may be determined by obtaining charging status information of the both parties and/or residual electric quantity information of the second electronic device whether the first electronic device or the second electronic device serves as the charging party (for details, refer to other related implementation manner); or 4) When the second electronic device is an electronic device whose output power is larger and a residual electric quantity of the first electronic device is greater than a first electric quantity threshold, it may be determined that the first electronic device is the charging party, or the entire process may end, or it may be determined by obtaining charging status information of the both parties and/or residual electric quantity information of the second electronic device whether the first electronic device or the second electronic device serves as the charging party (for details, refer to other related implementation manner).

It should be noted that, functions of the output power information, the residual electric quantity information, the first electric quantity threshold, and the charging status information that are described in this manner are the same as those in other related implementation manners described above, and details are not described herein again. Additionally, the first electronic device may first perform determining according to the output power information of the both electronic devices, or may first perform determining according to the residual electric quantity information of the first electronic device, and a determining sequence of the information is not limited in this manner.

Manner 9: The charging reference information includes: output power information of the first electronic device, output power information of the second electronic device, residual electric quantity information of the first electronic device and residual electric quantity information of the second electronic device.

Then, the first electronic device makes determining according to the charging reference information as follows:

1) When the first electronic device is an electronic device whose output power is larger and a residual electric quantity value of the first electronic device is greater than or equal to a first electric quantity threshold, it is determined that the first electronic device is the charging party;

2) When the second electronic device is an electronic device whose output power is larger and a residual electric quantity value of the second electronic device is greater than or equal to a second electric quantity threshold, it is determined that the second electronic device is the charging party;

3) When the second electronic device is an electronic device whose output power is larger, a residual electric quantity value of the first electronic device is greater than or equal to a first electric quantity threshold and a residual electric quantity of the second electronic device is less than a second electric quantity threshold, it may be determined that the first electronic device is the charging party, or the entire process may end, or it may be determined by obtaining charging status information of the both parties whether the first electronic device or the second electronic device serves as the charging party (for details, refer to other related implementation manner);

4) When the first electronic device is an electronic device whose output power is larger, a residual electric quantity value of the first electronic device is less than a first electric quantity threshold and a residual electric quantity of the second electronic device is greater than or equal to a second electric quantity threshold, it may be determined that the second electronic device is the charging party, or the entire process may end, or it may be determined by obtaining charging status information of the both parties whether the first electronic device or the second electronic device serves as the charging party (for details, refer to other related implementation manner); or 5) In other cases, the entire process may end, or it may be determined by obtaining charging status information of the both parties whether the first electronic device or the second electronic device serves as the charging party (for details, refer to other related implementation manner).

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the first electronic device may first perform determining according to the output power information of the both electronic devices, or may first perform determining according to the residual electric quantity information of the both electronic devices, and a determining sequence of the information is not limited in this manner.

Manner 10: The charging reference information includes: charging status information of the first electronic device, charging status information of the second electronic device, output power information of the first electronic device, residual electric quantity information of the first electronic device and/or residual electric quantity information of the second electronic device.

Then, the first electronic device makes determining according to the charging reference information as follows:

1) When an output power value of the first electronic device is greater than or equal to a preset power threshold, or an output power level is higher than or equal to a preset power level, the both electronic devices are not in a state of receiving power, and a residual electric quantity of the first electronic device is greater than or equal to a first electric quantity threshold, and/or a residual electric quantity of the second electronic device is less than a second electric quantity threshold, it is determined that the first electronic device is the charging party;

2) When an output power value of the first electronic device is greater than or equal to a preset power threshold, or an output power level is higher than or equal to a preset power level, the both electronic devices are not in a state of receiving power, and a residual electric quantity of the first electronic device is less than a first electric quantity threshold, and/or a residual electric quantity of the second electronic device is greater than or equal to a second electric quantity threshold, it may be determined that the second electronic device is the charging parry, or the entire process may end;

3) When an output power value of the first electronic device is greater than or equal to a preset power threshold, or an output power level is higher than or equal to a preset power level, and only the first electronic device is in a state of receiving power, it is determined that the first electronic device is the charging party;

4) When an output power value of the first electronic device is greater than or equal to a preset power threshold, or an output power level is higher than or equal to a preset power level, and only the second electronic device is in a state of receiving power, it may be determined that the second electronic device is the charging party, or the entire process may end;

5) When an output power value of the first electronic device is less than a preset power threshold, or an output power level is lower than or equal to a preset power level, the both electronic devices are not in a state of receiving power, and a residual electric quantity of the first electronic device is greater than or equal to a first electric quantity threshold, and/or a residual electric quantity of the second electronic device is less than a second electric quantity threshold, it may be determined that the first electronic device is the charging party, or the entire process may end;

6) When an output power value of the first electronic device is less than a preset power threshold, or an output power level is lower than or equal to a preset power level, the both electronic devices are not in a state of receiving power, and a residual electric quantity of the first electronic device is less than a first electric quantity threshold, and/or a residual electric quantity of the second electronic device is greater than or equal to a second electric quantity threshold, it may be determined that the second electronic device is the charging party, or the entire process may end;

7) When an output power value of the first electronic device is less than a preset power threshold, or an output power level is lower than a preset power level, and only the first electronic device is in a state of receiving power, it may be determined that the first electronic device is the charging party, or the entire process may end;

8) When an output power value of the first electronic device is less than a preset power threshold, or an output power level is lower than a preset power level, and only the second electronic device is in a state of receiving power, it may be determined that the first electronic device is the charging party, or the entire process may end; or 9) When the both electronic devices are in a state of receiving an electric quantity, the entire process is terminated.

Exemplarily, the first electronic device uses output power information of the first electronic device as a start determining condition. If the output power value of the first electronic device is greater than or equal to the preset power threshold, or the output power level is higher than or equal to the preset power level, determining is performed according to the charging status information and/or the residual electric quantity information of the both electronic devices:

1) When the both electronic devices are in a state of receiving power, the entire process is terminated;

2) When neither of the both electronic devices is in a state of receiving power and a residual electric quantity value of the first electronic device is greater than or equal to a first electric quantity threshold, or only the first electronic device is in a state of receiving power, it is determined that the first electronic device is the charging party; or 3) When only the second electronic device is in a state of receiving power, the entire process is terminated (it should be noted that, in this case, it may be also determined that the second electronic device is the charging party, but if charging is begun subsequently, a charging effect may be not ideal).

If the output power value of the first electronic device is less than the preset power threshold, or the output power level is lower than or equal to the preset power level, the entire process may end, or determining may be performed according to the charging status information and/or the residual electric quantity information of the both electronic devices:

1) When the both electronic devices are in a state of receiving power, the entire process is terminated;

2) When neither of the both electronic devices is in a state of receiving power, and a residual electric quantity value of the first electronic device is less than a first electric quantity threshold, and/or a residual electric quantity value of the second electronic device is greater than or equal to a second electric quantity threshold, it may be determined that the second electronic device is the charging party, or the entire process may end;

3) When neither of the both electronic devices is in a state of receiving power, and a residual electric quantity value of the first electronic device is greater than or equal to a first electric quantity threshold, and/or a residual electric quantity value of the second electronic device is less than a second electric quantity threshold, it may be determined that the first electronic device is the charging party, or the entire process may end;

4) When only the first electronic device is in a state of receiving power, it may be determined that the first electronic device is the charging party, or the entire process may end; or 5) When only the second electronic device is in a state of receiving power, it may be determined that the first electronic device is the charging party, or the entire process may end.

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the first electronic device may first perform determining according to the charging status information of the both electronic devices, or may first perform determining according to the output power information of the first electronic device, or may first perform determining according to the residual electric quantity information of the both electronic devices, and a determining sequence of the information is not limited in this manner.

Manner 11: The charging reference information includes: charging status information of the first electronic device, charging status information of the second electronic device, output power information of the first electronic device, output power information of the second electronic device, residual electric quantity information of the first electronic device and/or residual electric quantity information of the second electronic device.

Then, the first electronic device makes determining according to the charging reference information as follows:

1) When neither of the both electronic devices is in a state of receiving power, the first electronic device is an electronic device whose output power is larger, and a residual electric quantity value of the first electronic device is greater than or equal to a first electric quantity threshold, it is determined that the first electronic device is the charging party. Otherwise, if neither of the both electronic devices is in a state of receiving power, the second electronic device is an electronic device whose output power is larger, and a residual electric quantity value of the second electronic device is greater than or equal to a second electric quantity threshold, it is determined that the second electronic device is the charging party;

2) When only the first electronic device is in a state of receiving power, and the first electronic device is an electronic device whose output power is larger, it is determined that the first electronic device is the charging party. Otherwise, if only the second electronic device is in a state of receiving power, and the second electronic device is an electronic device whose output power is larger, it is determined that the second electronic device is the charging party;

3) When neither of the both electronic devices is in a state of receiving power, the first electronic device is an electronic device whose output power is larger, and a residual electric quantity value of the first electronic device is less than a first electric quantity threshold, the entire process is terminated (it should be noted that, in this case, if a residual electric quantity of the second electronic device is greater than or equal to a second electric quantity threshold, it may be also determined that the second electronic device is the charging party, but if charging is performed subsequently, a charging effect may be not ideal.). Otherwise, if neither of the both electronic devices is in a state of receiving power, the second electronic device is an electronic device whose output power is larger, and a residual electric quantity value of the second electronic device is less than the first electric quantity threshold, the entire process is terminated (it should be noted that, in this case, it may be also determined that the first electronic device is the charging party, and the reason is the same as that described above);

4) When only the first electronic device is in a state of receiving power, and the second electronic device is an electronic device whose output power is larger, the entire process is terminated (it should be noted that, in this case, it may be also determined that the first electronic device is the charging party, but if charging is begun subsequently, a charging effect may be not ideal.). Otherwise, if only the second electronic device is in a state of receiving power, and the first electronic device is an electronic device whose output power is larger, the entire process is terminated (it should be noted that, in this case, it may be also determined that the second electronic device is the charging party, and the reason is the same as that described above); or 5) When the both electronic devices are in a state of receiving power, the entire process is terminated.

Exemplarily, the first electronic device uses charging status information of the both electronic devices as a start determining condition. If the both electronic devices are in a state of receiving power, the entire process is ended. If neither of the both electronic devices is in a state of receiving power, the first electronic device then determines according to output power information and residual electric quantity information of the both electronic devices that an electronic device of the both electronic devices whose output power is larger and whose residual electric quantity value is greater than or equal to an electric quantity threshold (that is, a first electric quantity threshold or a second electric quantity threshold) is the charging parry. If only the first electronic device is in a state of receiving power, it is then determined, when it is determined according to output power information of the both electronic devices that the first electronic device is an electronic device whose output power is larger, that the first electronic device serves as the charging party. If only the second electronic device is in a state of receiving power, it is then determined, when it is determined according to output power information of the both electronic devices that the second electronic device is an electronic device whose output power is larger, that the second electronic device serves as the charging party.

Exemplarily, the first electronic device uses output power information of the both electronic devices as a start determining condition. If the first electronic device is an electronic device whose output power is larger, it is then determined according to charging status information and/or residual electric quantity information of the both electronic devices as follows:

1) When neither of the both electronic devices is in a state of receiving power and a residual electric quantity value of the first electronic device is greater than or equal to a first electric quantity threshold, or when the first electronic device is in a state of receiving power and the second electronic device is not in the state of receiving power, it is determined that the first electronic device is the charging party;

2) When the first electronic device is not in a state of receiving power and the second electronic device is in the state of receiving power, or when neither of the both electronic devices is in a state of receiving power and a residual electric quantity value of the first electronic device is less than a first electric quantity threshold, the entire process is terminated (it should be noted that, in this case, it may be also determined that the second electronic device is the charging party, but if charging is begun subsequently, a charging effect may be not ideal); or 3) When the both electronic devices are in a state of receiving power, the entire process is terminated.

If the second electronic device is an electronic device whose output power is larger, it is then determined according to charging status information and/or residual electric quantity information of the both electronic devices as follows:

1) When neither of the both electronic devices is in a state of receiving power and a residual electric quantity value of the second electronic device is greater than or equal to a second electric quantity threshold, or when the second electronic device is in a state of receiving power and the first electronic device is not in a state of receiving power, it is determined that the second electronic device is the charging party;

2) When the second electronic device is not in a state of receiving power and the first electronic device is in the state of receiving power, or when neither of the both electronic devices is in a state of receiving power and a residual electric quantity value of the second electronic device is less than a first electric quantity threshold, the entire process is terminated (it should be noted that, in this case, it may be also determined that the first electronic device is the charging party, but if charging is begun subsequently, a charging effect may be not ideal); or 3) When the both electronic devices are in a state of receiving power, the entire process is terminated. If the first electronic device and the second electronic device are electronic devices whose output powers are equivalent (that is, when output power levels of the both parties are the same, or an absolute value of a difference between output power values of the both parties is less than a power difference threshold), the entire process is terminated.

If output powers of the both electronic devices are equivalent, that is, output power levels of the both electronic devices are the same and/or an absolute value of a difference between output powers of the both electronic devices is less than a preset power difference threshold, the entire process may end, or it may be then determined according to charging status information and/or residual electric quantity information of the both electronic devices whether the first electronic device or the second electronic device serves as the charging party, a specific determining method is the same as those in the foregoing two exemplified cases, and details are not described herein again.

Exemplarily, the first electronic device uses residual electric quantity information of the both electronic devices as a start determining condition. If a residual electric quantity value of the first electronic device is greater than or equal to a first electric quantity threshold and a residual electric quantity value of the second electronic device is greater than or equal to a second electric quantity threshold, it is then determined according to output power information and charging status information of the both electronic devices as follows:

1) When a peer electronic device of an electronic device whose output power is larger is not in a state of receiving power, it is determined that an electronic device of the both electronic devices whose output power is larger is the charging parry; or 2) When a peer electronic device of an electronic device whose output power is larger is in a state of receiving power, the entire process is terminated.

If a residual electric quantity value of the first electronic device is less than a first electric quantity threshold and a residual electric quantity value of the second electronic device is less than a second electric quantity threshold, it is then determined according to output power information and charging status information of the both electronic devices as follows:

1) An electronic device of the both electronic devices whose output power is larger is the charging party when the electronic device is in a state of receiving power and a peer electronic device is not in the state of receiving power; or 2) When an electronic device whose output power is larger is not in a state of receiving power, or a peer device of an electronic device whose output power is larger is in a state of receiving power, the entire process is terminated.

If a residual electric quantity value of the first electronic device is greater than or equal to a first electric quantity threshold and a residual electric quantity value of the second electronic device is less than a second electric quantity threshold, it is then determined according to output power information and charging status information of the both electronic devices as follows:

1) When the first electronic device is an electronic device whose output power is larger and the second electronic device is not in a state of receiving power, it is determined that the first electronic device is the charging party;

2) When the second electronic device is an electronic device whose output power is larger and only the second electronic device is in a state of receiving power, it is determined that the second electronic device is the charging party;

3) When the first electronic device is an electronic device whose output power is larger and the second electronic device is in a state of receiving power, the entire process is terminated; or 4) When the second electronic device is an electronic device whose output power is larger, and the second electronic device is not in a state of receiving power or the first electronic device is in a state of receiving power, the entire process is terminated.

If a residual electric quantity value of the first electronic device is less than a first electric quantity threshold and a residual electric quantity value of the second electronic device is greater than or equal to a second electric quantity threshold, it is then determined according to output power information and charging status information of the both electronic devices as follows:

1) When the second electronic device is an electronic device whose output power is larger and the first electronic device is not in a state of receiving power, it is determined that the second electronic device is the charging party;

2) When the first electronic device is an electronic device whose output power is larger and only the first electronic device is in a state of receiving power, it is determined that the first electronic device is the charging party;

3) When the second electronic device is an electronic device whose output power is larger and the first electronic device is in a state of receiving power, the entire process is terminated; or 4) When the first electronic device is an electronic device whose output power is larger, and the first electronic device is not in a state of receiving power or the second electronic device is in a state of receiving power, the entire process is terminated.

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the first electronic device may first perform determining according to the charging status information of the both electronic devices, or may first perform determining according to the output power information of the both electronic devices, or may first perform determining according to the residual electric quantity information of the both electronic devices, and a determining sequence of the information is not limited in this manner.

S102: If it is determined that the charging party is the first electronic device, enable an NFC wireless charging service of the first electronic device, so as to prepare to charge the second electronic device. If the charging party is the second electronic device, the first electronic device instructs the second electronic device to enable an NFC wireless charging service, so as to prepare to charge the first electronic device.

Specifically, an electronic device that is already determined to be the charging party enables an NFC wireless charging service of the electronic device to prepare to provide a charging service to a peer electronic device.

It should be noted that, a conventional NFC wireless charging process includes an NFC wireless charging control phase and an NFC wireless electric energy transmission phase. Therefore, after a charging electronic device enables an NFC wireless charging service, the charging electronic device begins the NFC wireless charging process by using NFC communication, exchanges verification information, technical information and the like with a to-be-charged electronic device by using the NFC wireless charging control phase to select an NFC wireless charging manner or other wireless charging manners, and then charges the to-be-charged electronic device by using the NFC wireless charging electric energy transmission phase.

Additionally, the foregoing other wireless charging manners include but are not limited to wireless charging technologies separately formulated by three current major wireless charging alliances: WPC (Wireless Power Consortium), PMA (Power Matters Alliance) and A4WP (Alliance for Wireless Power).

By using the foregoing method, a first electronic device determines whether a charging party is the first electronic device or a second electronic device according to charging reference information, and when it is determined that the charging party is the first electronic device, the first electronic device enables an NFC wireless charging service of the first electronic device, or when it is determined that the charging party is the second electronic device, the first electronic device instructs the second electronic device to enable an NFC wireless charging service. In this way, when the first electronic device and the second electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

Figure 2:
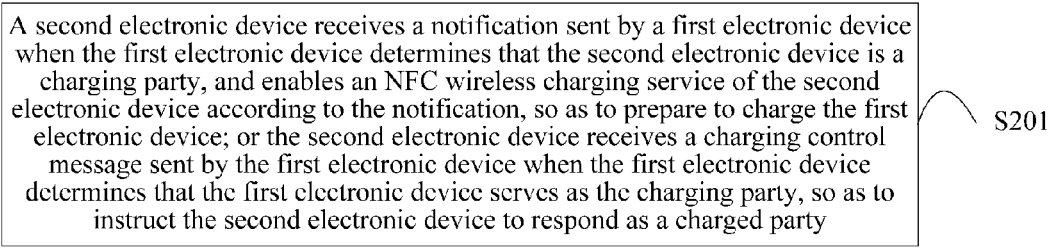
FIG. 2 is a schematic flowchart of another method for enabling an NFC wireless charging service according to an embodiment of the present invention.

An embodiment of the present invention provides a method for enabling an NFC wireless charging service. As shown in FIG. 2, the method includes:

S201: A second electronic device receives a notification sent by a first electronic device when the first electronic device determines that the second electronic device is a charging party, and enables an NFC wireless charging service of the second electronic device according to the notification, so as to prepare to charge the first electronic device. Or, the second electronic device receives a charging control message sent by the first electronic device when the first electronic device determines that the first electronic device serves as the charging party, so as to instruct the second electronic device to respond as a charged party.

Optionally, before the second electronic device receives the notification or the charging control message, the second electronic device sends at least one piece of charging status information of the second electronic device, output power information of the second electronic device and residual electric quantity information of the second electronic device to the first electronic device. Or, the second electronic device receives a request message of the first electronic device, and sends at least one piece of charging status information of the second electronic device, output power information of the second electronic device and residual electric quantity information of the second electronic device to the first electronic device according to the request message of the first electronic device.

It should be noted that, with reference to a previous embodiment, the first electronic device determines whether a charging party is the first electronic device or a second electronic device according to charging reference information, where the charging reference information includes: at least one piece of charging status information of the second electronic device, output power information of the second electronic device and residual electric quantity information of the second electronic device.

Specifically, when determining according to the charging reference message that the second electronic device is the charging party, the first electronic device sends the notification to the second electronic device, so that the second electronic device enables the NFC wireless charging service of the second electronic device according to the notification. After enabling the NFC wireless charging service, the second electronic device sends a charging control message to the first electronic device, to enter an NFC wireless charging control phase, and the second electronic device exchanges verification information, technical information and the like with the first electronic device by using the NFC wireless charging control phase to select an NFC wireless charging manner or other wireless charging manners, and then charges the first electronic device by using an NFC wireless charging electric energy transmission phase. When the first electronic device determines according to the charging reference message that the first electronic device is the charging party, the first electronic device enables an NFC wireless charging service, and the second electronic device receives the charging control message sent by the first electronic device and responds according to the charging control message, to enter the NFC wireless charging control phase.

It should be noted that, the both electronic devices may also select other wireless charging technologies by means of information exchange and negotiation in the NFC wireless charging control phase to perform charging, such as wireless charging technologies separately formulated by three current major wireless charging alliances: WPC (Wireless Power Consortium), PMA (Power Matters Alliance) and A4WP (Alliance for Wireless Power).

By using the foregoing method, a second electronic device receives a notification sent by a first electronic device when the first electronic device determines that the second electronic device is a charging party, and enables an NFC wireless charging service of the second electronic device according to the notification, so as to prepare to charge the first electronic device. Or, the second electronic device receives a charging control message sent by the first electronic device when the first electronic device determines that the first electronic device serves as the charging party, so as to instruct the second electronic device to respond as a charged party. In this way, when the first electronic device and the second electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

Figure 3:
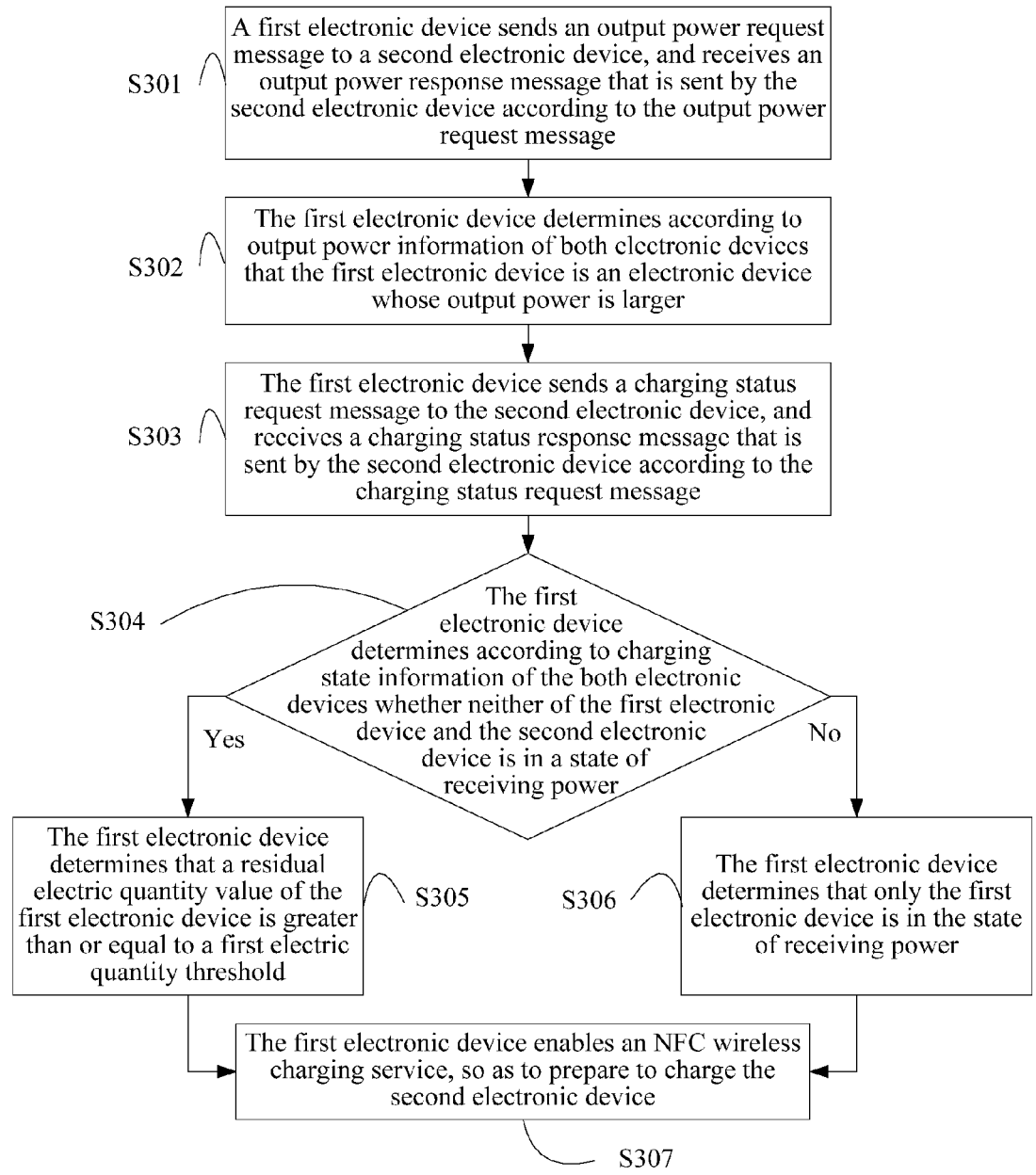
FIG. 3 is a schematic flowchart of another method for enabling an NFC wireless charging service according to an embodiment of the present invention.

An embodiment of the present invention provides another method for enabling NFC wireless charging, as shown in FIG. 3. In this embodiment, charging reference information includes: charging status information of both electronic devices, output power information of the both electronic devices and residual electric quantity information of a first electronic device.

Additionally, for convenience of description, the following steps are described by using the first electronic device as a charging party, and the method includes:

S301: A first electronic device sends an output power request message to a second electronic device, and receives an output power response message that is sent by the second electronic device according to the output power request message.

Specifically, when the first electronic device and the second electronic device are located within an NFC communication range and a time during which there is no NFC communication between the both electronic devices reaches a preset time threshold, the first electronic device sends the output power request message to the second electronic device. The output power request message sent by the first electronic device is used for learning output power information of the second electronic device.

It should be noted that, this embodiment is described by using an example in which the first electronic device is an initiator of the current NFC communication. Actually, the second electronic device may be also an initiator of the current NFC communication. In this case, the output power request message should be sent by the second electronic device to the first electronic device, and the following determining should be also completed by the second electronic device.

S302: The first electronic device determines according to output power information of both electronic devices that the first electronic device is an electronic device whose output power is larger.

Specifically, there are two implementation manners for step S302:

Manner 1: The output power information includes an output power value.

Specifically, the first electronic device obtains an output power value of the second electronic device according to the output power response message sent by the second electronic device, and if an absolute value of a difference between an output power value of the first electronic device and the output power value of the second electronic device is greater than a preset power difference threshold and the output power value of the first electronic device is greater than the output power value of the second electronic device, it is determined that the first electronic device is an electronic device whose output power is larger.

If the absolute value of the difference between the output power value of the first electronic device and the output power value of the second electronic device is less than the second preset power difference threshold, neither of the first electronic device and the second electronic device can serve as the charging party, and in this case, the entire process may end.

It should be noted that, the first electronic device obtains the output power information of the second electronic device by receiving the output power response message sent by the second electronic device, and the output power information of the second electronic device may be the output power value of the second electronic device, or an output current value and an output voltage value of the second electronic device, or may be the output power value, and an output current value and/or an output voltage value of the second electronic device, that is, the first electronic device can directly or indirectly obtain the output power value of the second electronic device by using the output power information.

Exemplarily, the output power value of the first electronic device is $P_{01}$, the output power value of the second electronic device is $P_{02}$, the output power difference threshold is $\Delta P_0$, and then after sending the output power request message to the second electronic device, the first electronic device receives the output power response message that is sent by the second electronic device according to the output power request message, where the output power response message carries the output power value $P_{02}$ of the second electronic device, and then the first electronic device determines that an absolute value of a difference between the output power values of the first electronic device and the second electronic device is $|P_{01}-P_{02}|$. For the output power difference threshold $\Delta P_0$, if the first electronic device determines that the absolute value $|P_{01}-P_{02}|$ of the difference between the output power values is greater than the output power difference threshold $\Delta P_0$ and $P_{01}>P_{02}$, the first electronic device determines that the first electronic device is an electronic device whose output power is larger.

Manner 2: The output power information is an output power level.

It should be noted that, an output power of an electronic device may be classified into a high level, an intermediate level, and a low level, for example, a device power level of an electronic device whose output power is less than or equal to 5 w is low, a device power level of an electronic device whose output power is greater than 5 w and less than or equal to 20 w is intermediate, and a device power level of an electronic device whose output power is greater than 20 w is high.

Specifically, the first electronic device obtains an output power level of the second electronic device according to the output power response message of the second electronic device, and if an output power level of the first electronic device is higher than the output power level of the second electronic device, it is determined that the first electronic device is an electronic device whose output power is larger.

Exemplarily, the output power level of the first electronic device is intermediate, the output power level of the second electronic device is low, and then after sending the output power request message to the second electronic device, the first electronic device receives the output power response message that is sent by the second electronic device according to the output power request message, where the output power response message carries the output power level of the second electronic device, and if the first electronic device determines according to the output power response message that the output power level of the first electronic device is higher than the output power level of the second electronic device, the first electronic device determines that the first electronic device is an electronic device whose output power is larger.

It should be noted that, when it is determined that the output power level of the second electronic device is the same as the output power level of the first electronic device, the first electronic device may determine according to the output power values of the both electronic devices that the first electronic device is an electronic device whose output power is larger, and for details, refer to description in Manner 1 described above.

S303: The first electronic device sends a charging status request message to the second electronic device, and receives a charging status response message that is sent by the second electronic device according to the charging status request message.

The charging status response message includes charging status information, and the first electronic device can determine according to the charging status information whether the second electronic device is in a state of receiving power.

S304: The first electronic device determines according to charging status information of the both electronic devices whether neither of the first electronic device and the second electronic device is in a state of receiving power.

If yes, step S305 is performed, or if not, step S306 is performed.

S305: The first electronic device determines that a residual electric quantity value of the first electronic device is greater than or equal to a first electric quantity threshold.

The first electric quantity threshold is preset by the first electronic device according to parameters of the first electronic device such as a total battery quantity.

Specifically, the first electronic device determines by using residual electric quantity information of the first electronic device that a current residual electric quantity value of the first electronic device, and compares the residual electric quantity value with the first electric quantity threshold. When the first electronic device determines that the residual electric quantity value of the first electronic device is greater than or equal to the first electric quantity threshold, the first electronic device may further inform a user of an electric quantity by which the first electronic device may specifically charge the second electronic device. For example, before enabling an NFC wireless charging function, the first electronic device may inform the user of "the electronic device may be charged by an electric quantity of XX mAh" by means of screen display or speech, description is made only by using an example herein, and a specific manner of informing the user is not limited in the present invention.

In another possible implementation manner of the present invention, the first electric quantity threshold may be further determined by the first electronic device according to residual electric quantity information of the both electronic devices.

Exemplarily, the first electronic device sends a battery information request to the second electronic device, and receives a battery information response that is sent by the second electronic device according to the battery information request, where the battery information request is used for learning residual electric quantity information of a battery of the second electronic device, and then the first electronic device determines the first electric quantity threshold according to the residual electric quantity information of the both electronic devices.

It should be noted that, the residual electric quantity information includes a residual electric quantity value and/or a total battery quantity, and/or a residual electric quantity percentage and a total battery quantity, and the residual electric quantity information may further include a charging demand indication and/or other related parameters such as a maximum or threshold discharging current.

Exemplarily, a residual electric quantity value of the first electronic device is 500 mAh, a minimum electric quantity value affecting normal usage of a device is 300 mAh, and if after sending a battery information request to the second electronic device, the first electronic device determines according to a battery information response sent by the second electronic device that a total battery quantity of the second electronic device is 150 mAh, and a residual electric quantity value of the second electronic device is 10 mAh, the first electronic device may set a first electric quantity threshold that can charge the second electronic device, such as, 400 mAh. If the first electronic device determines that the total battery quantity of the second electronic device is 2000 mAh, the residual electric quantity value of the second electronic device is 100 mAh, and a maximum discharging current of the second electronic device is 2 A, after the first electronic device charges the second electronic device by an electric quantity of 200 mAh, an estimated normal usage time of the second electronic device is about 10 minutes, and in this case, the first electronic device may set a first electric quantity threshold of 500 mAh for the second electronic device.

Further, after the first electronic device determines that the residual electric quantity value of the first electronic device is greater than the first electric quantity threshold, step S307 is performed.

S306: The first electronic device determines that only the first electronic device is in the state of receiving power.

Specifically, charging status information of the first electronic device indicates that the first electronic device is in the state of receiving power, and charging status information of the second electronic device indicates that the second electronic device is not in the state of receiving power.

S307: The first electronic device enables an NFC wireless charging service, so as to prepare to charge the second electronic device.

It should be noted that, after enabling the NFC wireless charging service, the first electronic device may further inform the user that wireless charging is already enabled, and certainly may further add a prompt of user confirmation, for example, after enabling the NFC wireless charging service, the first electronic device informs the user of "an NFC wireless charging service being already enabled" or "whether to agree to enable an NFC wireless charging service" by using a screen or speech, and sets options "confirm" and "cancel", description is made only by using an example herein, and a specific manner of informing the user is not limited in the present invention.

It should be noted that, in this embodiment, the output power request message and the charging status request message that are sent by the first electronic device to the second electronic device and a battery request message that may be needed are sent at several times in the manner, in this embodiment, that is included but is not limited. Certainly, the messages may be sent in other manners, for example, output power information, charging status information, and/or residual electric quantity information is requested from the second electronic device by using a request message. All needed information may be further obtained by using two request messages, and description is not made one by one again herein.

In this way, when the first electronic device and the second electronic device are located within an effective range of NFC communication, after determining according to the charging reference information that the first electronic device serves as the charging party, the first electronic device automatically enable the NFC wireless charging service, which makes full use of more fragmented time to charge the second electronic device, avoids time consumption and labor consumption caused due to an active operation of a user, and improves user experience.

It should be noted that, for ease of description, the foregoing method embodiments are all expressed as a combination of a series of actions. But a person skilled in the art should understand that the present invention is not limited to the order of the described actions. It should be further understood by a person skilled in the art that the described embodiments all belong to exemplary embodiments, and the involved actions and modules are not necessarily required by the present invention.

Figure 4:
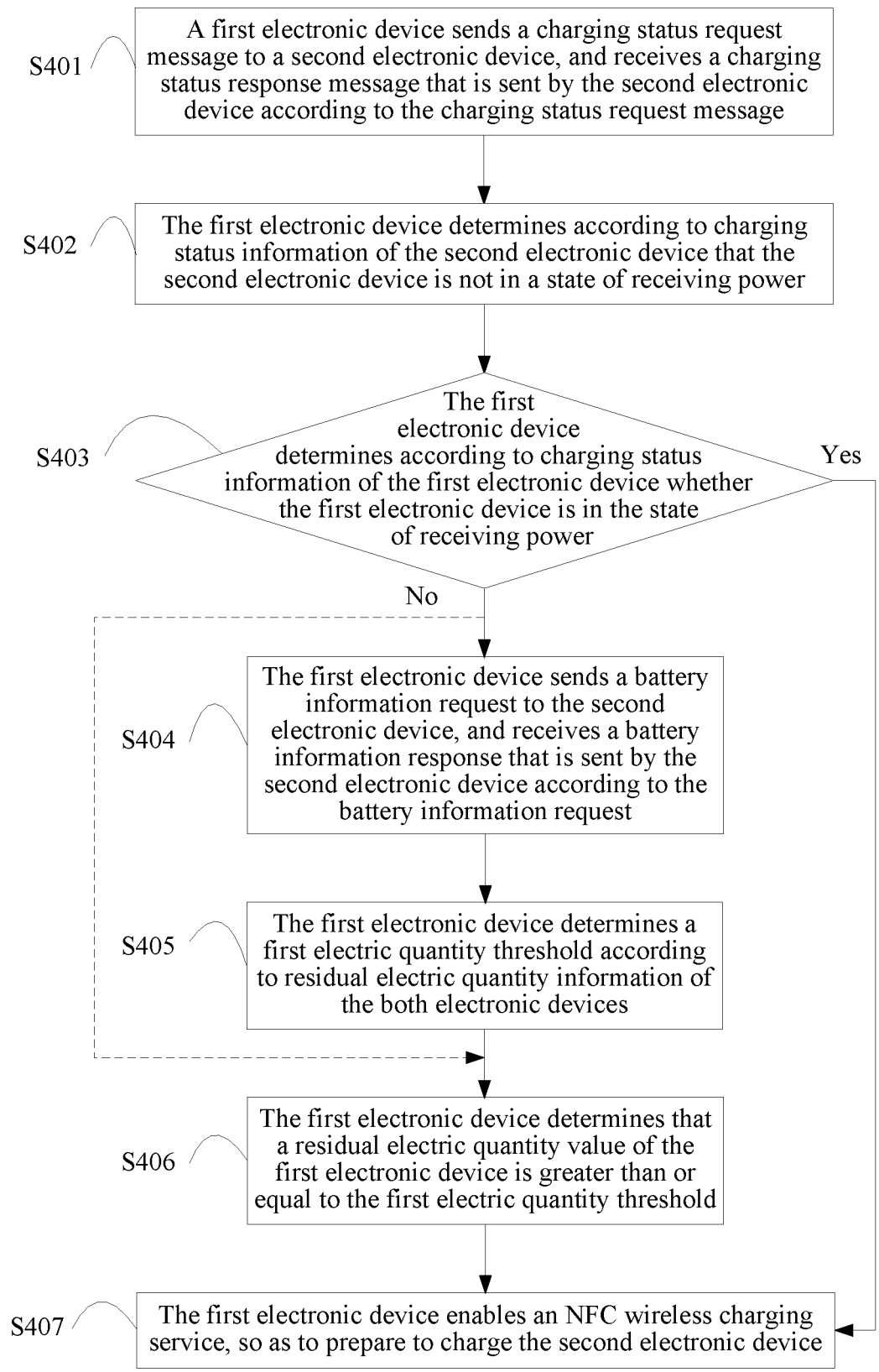
FIG. 4 is a schematic flowchart of another method for enabling an NFC wireless charging service according to an embodiment of the present invention.

An embodiment of the present invention provides another method for enabling an NFC wireless charging service, as shown in FIG. 4. In this embodiment, charging reference information includes: charging status information of both electronic devices, output power information of a first electronic device and residual electric quantity information of the both electronic devices.

Additionally, for convenience of description, the following steps are described by using the first electronic device as a charging party, and the method includes:

S401: A first electronic device sends a charging status request message to a second electronic device, and receives a charging status response message that is sent by the second electronic device according to the charging status request message.

The charging status request message is used for obtaining current charging status information of the second electronic device. The first electronic device can determine according to the charging status information whether the second electronic device is in a state of receiving power.

Specifically, when the first electronic device and the second electronic device are located within an NFC communication range and a time during which there is no NFC communication between the both electronic devices reaches a preset time threshold, the first electronic device obtains output power information of the first electronic device, where the output power information may include an output power value, and therefore when determining that the output power value is greater than or equal to a preset power threshold, the first electronic device sends a charging status request message to the second electronic device, where the preset power threshold is a threshold value that is preset according to an actual situation. The output power information may further include an output power level, and therefore when determining that the output power level is higher than a preset power level, the first electronic device sends a charging status request message to the second electronic device, where the preset power level is a threshold level that is preset according to an actual situation.

It should be noted that, if an output power value of the second electronic device is also greater than or equal to the output power threshold, the second electronic device may also send a charging status request message to the first electronic device. In this way, if the first electronic device receives the charging status request message sent by the second electronic device, the first electronic device sends an output power request message to the second electronic device, or receives an output power request message sent by the second electronic device, and finally determines by using output power levels or output power values of the both electronic devices whether the first electronic device or the second electronic device serves as the charging party. For details, refer to description corresponding to step 301 to step 303 in a previous embodiment.

Whether the first electronic device sends the output power request message to the second electronic device or the second electronic device sends the output power request message to the first electronic device may be determined by the both parties by setting respective random numbers in respective charging status request messages, and then comparing these two random numbers, for example, if the random number in the charging status request message sent by the first electronic device is greater than the random number of the second electronic device, the first electronic device sends the output power request message.

Exemplarily, the preset power threshold is $P_0$, the output power value of the first electronic device is $P_{01}$, and the output power value of the second electronic device is $P_{02}$, where $P_{01}$ is greater than $P_0$ and $P_{02}$ is greater than $P_0$, and therefore the first electronic device sends a first charging status request message to the second electronic device, and receives a second charging status request message sent by the second electronic device, where the first charging status request message includes a random number $R_1$, and the second charging status request message includes a random number $R_2$. If the first electronic device determines that the random number $R_1$ is greater than the random number $R_2$, the first electronic device sends an output power request message to the second electronic device. If the first electronic device determines that the random number $R_1$ is less than the random number $R_2$, the first electronic device receives an output power request message sent by the second electronic device.

S402: The first electronic device determines according to charging status information of the second electronic device that the second electronic device is not in a state of receiving power.

The manner of receiving power may be wired or wireless.

It should be noted that, if the first electronic device determines according to the charging status information that the second electronic device is in the state of receiving power, the entire process of enabling an NFC wireless charging service is ended.

S403: The first electronic device determines according to charging status information of the first electronic device whether the first electronic device is in the state of receiving power.

If the first electronic device is currently not in the state of receiving power, step S404 to step S406 are performed. If the first electronic device is currently in the state of receiving power, step S407 is performed.

S404: The first electronic device sends a battery information request to the second electronic device, and receives a battery information response that is sent by the second electronic device according to the battery information request.

It should be noted that, this step is optional.

The battery information response includes residual electric quantity information of the second electronic device.

S405: The first electronic device determines a first electric quantity threshold according to residual electric quantity information of the both electronic devices.

It should be noted that, this step is optional, and consistent with step S404, that is, if there is no step S404, there is no step S405; and if there is step S404, there is step S405.

It should be noted that, the residual electric quantity information includes a residual electric quantity value and/or a total battery quantity, and/or a residual electric quantity percentage and a total battery quantity, and the residual electric quantity information may further include a charging demand indication and/or other related parameters such as a maximum or threshold discharging current.

Exemplarily, a residual electric quantity value of the first electronic device is 500 mAh, a minimum electric quantity value affecting normal usage of a device is 300 mAh, and if after sending a battery information request to the second electronic device, the first electronic device determines according to a battery information response sent by the second electronic device that a total battery quantity of the second electronic device is 150 mAh, and a residual electric quantity value of the second electronic device is 10 mAh, the first electronic device may set a first electric quantity threshold that can charge the second electronic device, such as, 400 mAh. If the first electronic device determines that the total battery quantity of the second electronic device is 2000 mAh, the residual electric quantity value of the second electronic device is 100 mAh, and a maximum discharging current of the second electronic device is 2 A, after the first electronic device charges the second electronic device by an electric quantity of 200 mAh, an estimated normal usage time of the second electronic device is about 10 minutes, and in this case, the first electronic device may set a first electric quantity threshold of 500 mAh for the second electronic device.

S406: The first electronic device determines that a residual electric quantity value of the first electronic device is greater than or equal to the first electric quantity threshold.

It should be noted that, the first electric quantity threshold may be also preset according to parameters of the first electronic device such as a total battery quantity, and then when the first electronic device determines according to the charging status response message that the second electronic device is in an uncharged state and the first electronic device is also currently in the uncharged state, the first electronic device may directly determine whether a residual electric quantity value of the first electronic device is greater than the preset electric quantity threshold, and the step is shown by a dashed line in FIG. 4.

S407: The first electronic device enables an NFC wireless charging service, so as to prepare to charge the second electronic device.

It should be noted that, after enabling the NFC wireless charging service, the first electronic device may further inform the user that the wireless charging service is already enabled, and certainly may further add a prompt of user confirmation, for example, after enabling the NFC wireless charging service, the first electronic device informs the user of "an NFC wireless charging service being already enabled" or "whether to agree to enable an NFC wireless charging service" by means of screen display or speech, and sets options "confirm" and "cancel", description is made only by using an example herein, and a specific manner of informing the user is not limited in the present invention.

It should be noted that, in this embodiment, a manner of sending the output power request message and the charging status request message that are sent by the first electronic device to the second electronic device and a battery request message that may be needed is the same as the manner described in the embodiment corresponding to FIG. 3, and details are not described herein again.

in this way, when the first electronic device and the second electronic device are located within an effective range of NFC communication, after determining according to the charging reference information that the first electronic device serves as the charging party, the first electronic device automatically enable the NFC wireless charging service, which makes full use of more fragmented time to charge the second electronic device, avoids time consumption and labor consumption caused due to an active operation of a user, and improves user experience.

It should be noted that, for ease of description, the foregoing method embodiments are all expressed as a combination of a series of actions. But a person skilled in the art should understand that the present invention is not limited to the order of the described actions. It should be further understood by a person skilled in the art that the described embodiments all belong to exemplary embodiments, and the involved actions and modules are not necessarily required by the present invention.

Figure 5:
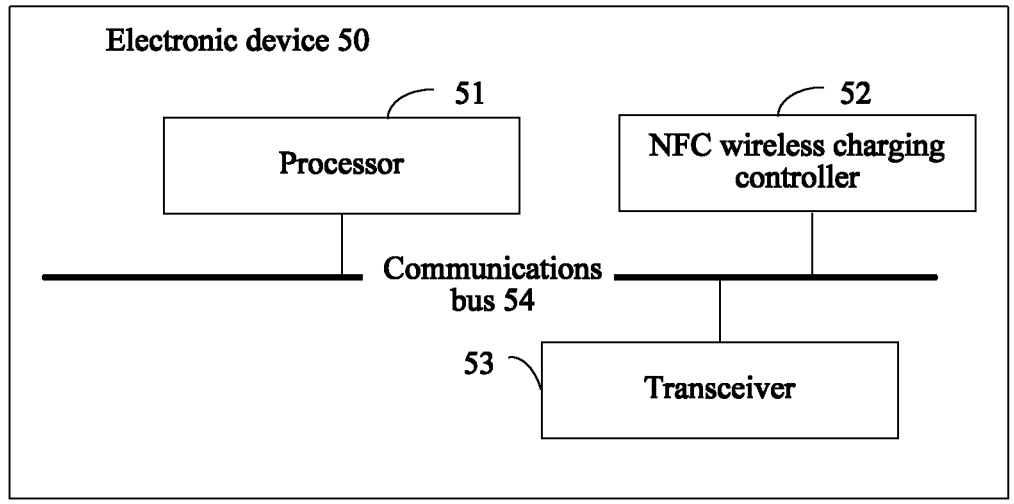
FIG. 5 is a schematic structural diagram of an electronic device according to an embodiment of the present invention.

An embodiment of the present invention provides an electronic device 50, and as shown in FIG. 5, the electronic device 50 includes:

a processor 51, an NFC wireless charging controller 52, a transceiver 53 and a communications bus 54, where the processor 51, the NFC wireless charging controller 52 and the transceiver 53 complete mutual communication by using the communications bus 54.

The processor 51 may be a multi-core central processing unit CPU, or an application specific integrated circuit ASIC (Application Specific Integrated Circuit), or one or more integrated circuits configured to implement this embodiment of the present invention.

The processor 51 is configured to determine whether the electronic device is a charging party or a second electronic device is a charging party according to charging reference information. If it is determined that the electronic device is the charging party, control the NFC wireless charging controller 52 to enable an NFC wireless charging service, so as to prepare to charge the second electronic device. If it is determined that the second electronic device is the charging party, control the transceiver 53 to send a notification to the second electronic device.

The NFC wireless charging controller 52 is configured to enable the NFC wireless charging service according to control of the processor 51, so as to prepare to charge the second electronic device.

The transceiver 53 is configured to send the notification to the second electronic device according to control of the processor 51, so that the second electronic device enables an NFC wireless charging service of the second electronic device according to the notification, and prepares to charge the electronic device.

Optionally, the processor 51 is further configured to: before it is determined whether the electronic device is the charging party or the second electronic device is the charging party according to the charging reference information, determine that the electronic device and the second electronic device are kept within an effective distance of NFC communication and a time in which no NFC communication occurs between the both electronic devices exceeds a preset time threshold.

If information included in the charging reference information differs, a manner in which the processor 51 determines whether the electronic device is the charging party or the second electronic device is the charging party also differs, and includes:

Manner 1: The charging reference information includes: charging status information of the electronic device and charging status information of the second electronic device. Then, the electronic device makes determining according to the charging reference information as follows:

1) when the electronic device is not in a state of receiving power and the second electronic device is in the state of receiving power, it is determined that the second electronic device is the charging party;

2) when the electronic device is in a state of receiving power and the second electronic device is not in the state of receiving power, it is determined that the electronic device is the charging party;

3) when the electronic device is not in a state of receiving power and the second electronic device is not in the state of receiving power, it may be randomly determined whether the electronic device or the second electronic device is the charging party, or the entire process may end, or it may be determined by obtaining output power information, residual electric quantity information and the like of the electronic device and the second electronic device whether the electronic device or the second electronic device serves as the charging party (for details, refer to the following related implementation manner); or 4) when the electronic device is in a state of receiving power and the second electronic device is in the state of receiving power, the entire process is terminated.

Specifically, the charging status information includes a charging identifier that is used for denoting whether a corresponding electronic device is in a state of receiving power, and then when one electronic device is in the state of receiving power, and the other electronic device is not in the state of receiving power, the electronic device determines that an electronic device being in the state of receiving power is the charging party, and enables an NFC wireless charging service of the charging party, so as to prepare to charge the peer electronic device. When neither of the both electronic devices is in the state of receiving power, the electronic device may randomly determine that one electronic device is the charging party, or it may be determined by obtaining output power information, residual electric quantity information and the like of the electronic device and the second electronic device whether the electronic device or the second electronic device serves as the charging party (for details, refer to the following related implementation manner). When the both electronic devices are in the state of receiving power, the entire process is terminated.

Manner 2: The charging reference information includes: output power information of the electronic device.

Then, the electronic device makes determining according to the charging reference information as follows:

1) when an output power value of the electronic device is greater than or equal to a preset power threshold, or an output power level is higher than or equal to a preset power level, it is determined that the electronic device is the charging party; or 2) when an output power of the electronic device is less than a preset power threshold, it may be determined that the second electronic device is the charging party, or it may be determined by obtaining an output power of the second electronic device and/or charging status information of the both parties and/or residual electric quantity information of the both parties whether the electronic device or the second electronic device serves as the charging party (for details, refer to the following related implementation manner).

Specifically, the output power information may include an output power value, and then the preset power threshold is a threshold value that is preset according to an actual situation. The output power information may include an output power level, and then the preset power level is a threshold level that is preset according to an actual situation. For example, when the output power of the electronic device is sufficiently large (for example, the electronic device is a high-power device), the electronic device may be the charging party by default.

Manner 3: The charging reference information includes: output power information of the electronic device and output power information of the second electronic device.

Then, the electronic device makes determining according to the charging reference information as follows:

1) when the electronic device is an electronic device whose output power is larger, it is determined that the electronic device is the charging party;

2) when the second electronic device is an electronic device whose output power is larger, it is determined that the second electronic device is the charging party; or 3) when the electronic device and the second electronic device are electronic devices whose output powers are equivalent, it may be randomly determined that one electronic device is the charging party, or the entire process may end, or it may be determined by obtaining charging status information of the both electronic devices and/or residual electric quantity information of the electronic device or the both electronic devices whether the electronic device or the second electronic device serves as the charging party (for details, refer to the following related implementation manner).

Specifically, the output power information may include output power levels, such as a high level, an intermediate level, and a low level, and in this case, the electronic device determines an electronic device whose output power is larger by comparing output power levels of the both electronic devices, and determines that the electronic device whose output power is larger is the charging party, for example, when the output power levels of the both electronic devices at least differ by one level, an electronic device whose level is large is the electronic device whose output power is larger. The output power information may also include an output power value, and in this case, when determining that a difference between output power values of the both electronic devices is greater than a preset power difference threshold, the electronic device determines that an electronic device whose output power value is larger is the charging party, for example, an output power value of the electronic device and an output power value of the second electronic device are P1 and P2 respectively, and the preset power difference threshold is $\Delta P$, and therefore if P1>P2 and |P1−P2|>$\Delta P$, the electronic device is the electronic device whose output power is larger.

It should be noted that, the output power information may include both an output power level and an output power value, and then when output power levels of the both electronic devices are the same, the electronic device may determine the electronic device whose output power is larger by using the foregoing method, that is, by comparing the difference between the output power values of the both electronic devices with the preset power difference threshold. Additionally, the electronic device may indirectly obtain the output power value by obtaining an output current and an output voltage.

Manner 4: The charging reference information includes: output power information of the electronic device, charging status information of the electronic device and/or charging status information of the second electronic device.

Then, the electronic device makes determining according to the charging reference information as follows:

1) when an output power value of the electronic device is greater than or equal to a preset power threshold, or an output power level is higher than or equal to a preset power level, and the electronic device is in a state of receiving power and/or the second electronic device is not in the state of receiving power, it is determined that the electronic device is the charging party;

2) when an output power value of the electronic device is greater than or equal to a preset power threshold, or an output power level is higher than or equal to a preset power level, and the second electronic device is in a state of receiving power, it may be determined that the second electronic device is the charging party, or the entire process may end;

3) when an output power value of the electronic device is less than a preset power threshold, or an output power level is lower than a preset power level, and the electronic device is not in a state of receiving power, it may be determined that the second electronic device is the charging party, or the process may end, or it may be determined by obtaining output power information of the second electronic device and/or residual electric quantity information of the both electronic devices whether the electronic device or the second electronic device serves as the charging party (for details, refer to other implementation manner); or 4) when an output power value of the electronic device is less than a preset power threshold, or an output power level is lower than a preset power level, and the electronic device is in a state of receiving power, it may be determined that the electronic device is the charging party, or the process may end.

It should be noted that, functions of the charging status information, the output power information, the preset power threshold, and the preset power level that are described in this manner are the same as those in other related implementation manners described above, and details are not described herein again. Additionally, the electronic device may first perform determining according to the output power information, or may first perform determining according to the charging status information of the both electronic devices, and a determining sequence of the information is not limited in this manner.

Manner 5: The charging reference information includes: output power information of the electronic device, output power information of the second electronic device, charging status information of the electronic device and charging status information of the second electronic device.

Then, the electronic device makes determining according to the charging reference information as follows:

1) when the electronic device is an electronic device whose output power is larger and the second electronic device is not in a state of receiving power, it is determined that the electronic device is the charging party;

2) when the electronic device is an electronic device whose output power is larger and the second electronic device is in a state of receiving power, it may be determined that the second electronic device is the charging party, or the entire process may end;

3) when the second electronic device is an electronic device whose output power is larger and the electronic device is not in a state of receiving power, it is determined that the second electronic device is the charging party; or 4) when the second electronic device is an electronic device whose output power is larger and the electronic device is in a state of receiving power, it may be determined that the electronic device is the charging party, or the entire process may end.

It should be noted that, functions of the charging status information and the output power information that are described in this manner are the same as those in other related implementation manners described above, and details are not described herein again. For a method for determining the electronic device whose output power is larger, refer to specific description in Manner 3 described above, and details are not described herein again. Additionally, the electronic device may first perform determining according to the output power information of the both electronic devices, or may first perform determining according to the charging status information of the both electronic devices, and a determining sequence of the information is not limited in this manner.

Manner 6: The charging reference information includes: charging status information of the electronic device, charging status information of the second electronic device and residual electric quantity information of the electronic device.

Then, the electronic device makes determining according to the charging reference information as follows:

1) when a residual electric quantity value of the electronic device is greater than or equal to a first electric quantity threshold, and the second electronic device is not in a state of receiving power, it is determined that the electronic device is the charging party;

2) when a residual electric quantity value of the electronic device is greater than or equal to a first electric quantity threshold, and the second electronic device is in a state of receiving power, it may be determined that the second electronic device is the charging party, or the entire process may end;

3) when a residual electric quantity value of the electronic device is less than a first electric quantity threshold, and the electronic device is in a state of receiving power, it may be determined that the electronic device is the charging party, or the entire process may end; or 4) when a residual electric quantity value of the electronic device is less than a first electric quantity threshold, and the electronic device is not in a state of receiving power, it may be determined that the second electronic device is the charging party, or the entire process may end.

Specifically, the first electric quantity threshold may be a preset electric quantity threshold, or an electric quantity threshold that is set by the electronic device according to residual electric quantity information of the both electronic devices after the first electronic device obtains residual electric quantity information of the second electronic device.

Exemplarily, the electronic device sends a battery information request to the second electronic device, and receives a battery information response that is sent by the second electronic device according to the battery information request, where the battery information request is used for learning residual electric quantity information of a battery of the second electronic device, and then the electronic device determines the first electric quantity threshold according to the residual electric quantity information of the both electronic devices.

It should be noted that, the residual electric quantity information includes a residual electric quantity value and/or a total battery quantity, and/or a residual electric quantity percentage and a total battery quantity, and the residual electric quantity information may further include a charging demand indication and/or other related parameters such as a maximum or threshold discharging current.

Exemplarily, a residual electric quantity value of the electronic device is 500 mAh, a minimum electric quantity value affecting normal usage of a device is 300 mAh, and if after sending a battery information request to the second electronic device, the electronic device determines according to a battery information response sent by the second electronic device that a total battery quantity of the second electronic device is 150 mAh, and a residual electric quantity value of the second electronic device is 10 mAh, the electronic device may set a first electric quantity threshold that can charge the second electronic device, such as, 400 mAh; and if the electronic device determines that the total battery quantity of the second electronic device is 2000 mAh, the residual electric quantity value of the second electronic device is 100 mAh, and a maximum discharging current of the second electronic device is 2 A, after the electronic device charges the second electronic device by an electric quantity of 200 mAh, an estimated normal usage time of the second electronic device is about 10 minutes, and in this case, the electronic device may set a first electric quantity threshold of 500 mAh for the second electronic device.

It should be noted that, a function of the charging status information that is described in this manner is the same as those in other related implementation manners described above, and details are not described herein again. Additionally, the electronic device may first perform determining according to the residual electric quantity information of the electronic device, or may first perform determining according to the charging status information of the both electronic devices, and a determining sequence of the information is not limited in this manner.

Manner 7: The charging reference information includes: output power information of the electronic device and residual electric quantity information of the electronic device.

Then, the electronic device makes determining according to the charging reference information as follows:

1) When an output power value of the electronic device is greater than or equal to a preset power threshold, or an output power level is higher than or equal to a preset power level, and a residual electric quantity value of the electronic device is greater than or equal to a first electric quantity threshold, it is determined that the electronic device is the charging party;

2) When an output power value of the electronic device is greater than or equal to a preset power threshold, or an output power level is higher than or equal to a preset power level, and a residual electric quantity value of the electronic device is less than a first electric quantity threshold, it may be determined that the second electronic device is the charging party, or the entire process may end, or it may be determined by obtaining charging statuses of the both electronic devices and/or a residual electric quantity of the second electronic device and/or output power information of the second electronic device whether the electronic device or the second electronic device serves as the charging party (for details, refer to other related implementation manner);

3) When an output power value of the electronic device is less than a preset power threshold, or an output power level is lower than a preset power level, and a residual electric quantity value of the electronic device is greater than or equal to a first electric quantity threshold, it may be determined that the electronic device is the charging party, or the entire process may end, or it may be determined by obtaining charging statuses of the both electronic devices and/or a residual electric quantity of the second electronic device and/or output power information of the second electronic device whether the electronic device or the second electronic device serves as the charging party (for details, refer to other related implementation manner); or 4) When an output power value of the electronic device is less than a preset power threshold, or an output power level is lower than a preset power level, and a residual electric quantity value of the electronic device is less than a first electric quantity threshold, it may be determined that the second electronic device is the charging party, or the entire process may end, or it may be determined by obtaining charging statuses of the both electronic devices and/or a residual electric quantity of the second electronic device and/or output power information of the second electronic device whether the electronic device or the second electronic device serves as the charging party (for details, refer to other related implementation manner).

It should be noted that, functions of the output power information, the preset power threshold, the preset power level, the residual electric quantity information, the first electric quantity threshold, and the charging status information that are described in this manner are the same as those in other related implementation manners described above, and details are not described herein again. Additionally, the electronic device may first perform determining according to the output power information of the electronic devices, or may first perform determining according to the residual electric quantity information of the electronic devices, and a determining sequence of the information is not limited in this manner.

Manner 8: The charging reference information includes: output power information of the second electronic device, output power information of the electronic device and residual electric quantity information of the electronic device.

Then, the electronic device makes determining according to the charging reference information as follows:

1) When the electronic device is an electronic device whose output power is larger and a residual electric quantity value of the electronic device is greater than or equal to a first electric quantity threshold, it is determined that the electronic device is the charging party;

2) When the second electronic device is an electronic device whose output power is larger and a residual electric quantity value of the electronic device is less than a first electric quantity threshold, it is determined that the second electronic device is the charging party;

3) When the electronic device is an electronic device whose output power is larger and a residual electric quantity of the electronic device is less than a first electric quantity threshold, it may be determined that the second electronic device is the charging party, or the entire process may end, or it may be determined by obtaining charging status information of the both parties and/or residual electric quantity information of the second electronic device whether the electronic device or the second electronic device serves as the charging party (for details, refer to other related implementation manner); or 4) When the second electronic device is an electronic device whose output power is larger and a residual electric quantity of the electronic device is greater than a first electric quantity threshold, it may be determined that the electronic device is the charging party, or the entire process may end, or it may be determined by obtaining charging status information of the both parties and/or residual electric quantity information of the second electronic device whether the electronic device or the second electronic device serves as the charging party (for details, refer to other related implementation manner).

It should be noted that, functions of the output power information, the residual electric quantity information, the first electric quantity threshold, and the charging status information that are described in this manner are the same as those in other related implementation manners described above, and details are not described herein again. Additionally, the electronic device may first perform determining according to the output power information of the both electronic devices, or may first perform determining according to the residual electric quantity information of the electronic devices, and a determining sequence of the information is not limited in this manner.

Manner 9: The charging reference information includes: output power information of the electronic device, output power information of the second electronic device, residual electric quantity information of the electronic device and residual electric quantity information of the second electronic device.

Then, the electronic device makes determining according to the charging reference information as follows:

1) When the electronic device is an electronic device whose output power is larger and a residual electric quantity value of the electronic device is greater than or equal to a first electric quantity threshold, it is determined that the electronic device is the charging party;

2) When the second electronic device is an electronic device whose output power is larger and a residual electric quantity value of the second electronic device is greater than or equal to a second electric quantity threshold, it is determined that the second electronic device is the charging party;

3) When the second electronic device is an electronic device whose output power is larger, a residual electric quantity value of the electronic device is greater than or equal to a first electric quantity threshold and a residual electric quantity of the second electronic device is less than a second electric quantity threshold, it may be determined that the electronic device is the charging party, or the entire process may end, or it may be determined by obtaining charging status information of the both parties whether the electronic device or the second electronic device serves as the charging party (for details, refer to other related implementation manner);

4) When the electronic device is an electronic device whose output power is larger, a residual electric quantity value of the electronic device is less than a first electric quantity threshold and a residual electric quantity of the second electronic device is greater than or equal to a second electric quantity threshold, it may be determined that the second electronic device is the charging party, or the entire process may end, or it may be determined by obtaining charging status information of the both parties whether the electronic device or the second electronic device serves as the charging party (for details, refer to other related implementation manner); or 5) In other cases, the entire process may end, or it may be determined by obtaining charging status information of the both parties whether the electronic device or the second electronic device serves as the charging party (for details, refer to other related implementation manner).

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the electronic device may first perform determining according to the output power information of the both electronic devices, or may first perform determining according to the residual electric quantity information of the both electronic devices, and a determining sequence of the information is not limited in this manner.

Manner 10: The charging reference information includes: charging status information of the electronic device, charging status information of the second electronic device, output power information of the electronic device, residual electric quantity information of the electronic device and/or residual electric quantity information of the second electronic device.

Then, the electronic device makes determining according to the charging reference information as follows:

1) when an output power value of the electronic device is greater than or equal to a preset power threshold, or an output power level is higher than or equal to a preset power level, the both electronic devices are not in a state of receiving power, and a residual electric quantity of the electronic device is greater than or equal to a first electric quantity threshold, and/or a residual electric quantity of the second electronic device is less than a second electric quantity threshold, it is determined that the electronic device is the charging party;

2) when an output power value of the electronic device is greater than or equal to a preset power threshold, or an output power level is higher than or equal to a preset power level, the both electronic devices are not in a state of receiving power, and a residual electric quantity of the electronic device is less than a first electric quantity threshold, and/or a residual electric quantity of the second electronic device is greater than or equal to a second electric quantity threshold, it may be determined that the second electronic device is the charging party, or the entire process may end;

3) when an output power value of the electronic device is greater than or equal to a preset power threshold, or an output power level is higher than or equal to a preset power level, and only the electronic device is in a state of receiving power, it is determined that the electronic device is the charging party;

4) when an output power value of the electronic device is greater than or equal to a preset power threshold, or an output power level is higher than or equal to a preset power level, and only the second electronic device is in a state of receiving power, it may be determined that the second electronic device is the charging party, or the entire process may end;

5) when an output power value of the electronic device is less than a preset power threshold, or an output power level is lower than or equal to a preset power level, the both electronic devices are not in a state of receiving power, and a residual electric quantity of the electronic device is greater than or equal to a first electric quantity threshold, and/or a residual electric quantity of the second electronic device is less than a second electric quantity threshold, it may be determined that the electronic device is the charging party, or the entire process may end;

6) when an output power value of the electronic device is less than a preset power threshold, or an output power level is lower than or equal to a preset power level, the both electronic devices are not in a state of receiving power, and a residual electric quantity of the electronic device is less than a first electric quantity threshold, and/or a residual electric quantity of the second electronic device is greater than or equal to a second electric quantity threshold, it may be determined that the second electronic device is the charging party, or the entire process may end;

7) when an output power value of the electronic device is less than a preset power threshold, or an output power level is lower than a preset power level, and only the electronic device is in a state of receiving power, it may be determined that the electronic device is the charging parry, or the entire process may end;

8) when an output power value of the electronic device is less than a preset power threshold, or an output power level is lower than a preset power level, and only the second electronic device is in a state of receiving power, it may be determined that the electronic device is the charging party, or the entire process may end; or 9) when the both electronic devices are in a state of receiving an electric quantity, the entire process is terminated.

Exemplarily, the electronic device uses output power information of the electronic devices as a start determining condition. If the output power value of the electronic device is greater than or equal to the preset power threshold, or the output power level is higher than or equal to the preset power level, determining is performed according to the charging status information and/or the residual electric quantity information of the both electronic devices:

1) when the both electronic devices are in a state of receiving power, the entire process is terminated;

2) when neither of the both electronic devices is in a state of receiving power and a residual electric quantity value of the first electronic device is greater than or equal to a first electric quantity threshold, or only the electronic device is in a state of receiving power, it is determined that the electronic device is the charging party; or 3) when only the second electronic device is in a state of receiving power, the entire process is terminated (it should be noted that, in this case, it may be also determined that the second electronic device is the charging party, but if charging is begun subsequently, a charging effect may be not ideal).

If the output power value of the electronic device is less than the preset power threshold, or the output power level is lower than or equal to the preset power level, the entire process may end, or determining may be performed according to the charging status information and/or the residual electric quantity information of the both electronic devices:

1) when the both electronic devices are in a state of receiving power, the entire process is terminated;

2) when neither of the both electronic devices is in a state of receiving power, and a residual electric quantity value of the electronic device is less than a first electric quantity threshold, and/or a residual electric quantity value of the second electronic device is greater than or equal to a second electric quantity threshold, it may be determined that the second electronic device is the charging party, or the entire process may end;

3) when neither of the both electronic devices is in a state of receiving power, and a residual electric quantity value of the electronic device is greater than or equal to a first electric quantity threshold, and/or a residual electric quantity value of the second electronic device is less than a second electric quantity threshold, it may be determined that the electronic device is the charging party, or the entire process may end;

4) when only the electronic device is in a state of receiving power, it may be determined that the electronic device is the charging party, or the entire process may end; or 5) when only the second electronic device is in a state of receiving power, it may be determined that the electronic device is the charging party, or the entire process may end.

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices; for a specific method, refer to specific description in Manner 6 described above, and details are not described herein again. Additionally, the electronic device may first perform determining according to the charging status information of the both electronic devices, or may first perform determining according to the output power information of the electronic device, or may first perform determining according to the residual electric quantity information of the both electronic devices, and a determining sequence of the information is not limited in this manner.

Manner 11: The charging reference information includes: charging status information of the electronic device, charging status information of the second electronic device, output power information of the electronic device, output power information of the second electronic device, residual electric quantity information of the electronic device and/or residual electric quantity information of the second electronic device.

Then, the electronic device makes determining according to the charging reference information as follows:

1) when neither of the both electronic devices is in a state of receiving power, the electronic device is an electronic device whose output power is larger, and a residual electric quantity value of the electronic device is greater than or equal to a first electric quantity threshold, it is determined that the electronic device is the charging party; otherwise, if neither of the both electronic devices is in a state of receiving power, the second electronic device is an electronic device whose output power is larger, and a residual electric quantity value of the second electronic device is greater than or equal to a second electric quantity threshold, it is determined that the second electronic device is the charging party;

2) when only the electronic device is in a state of receiving power, and the electronic device is an electronic device whose output power is larger, it is determined that the electronic device is the charging party. Otherwise, if only the second electronic device is in a state of receiving power, and the second electronic device is an electronic device whose output power is larger, it is determined that the second electronic device is the charging party;

3) when neither of the both electronic devices is in a state of receiving power, the electronic device is an electronic device whose output power is larger, and a residual electric quantity value of the electronic device is less than a first electric quantity threshold, the entire process is terminated (it should be noted that, in this case, if a residual electric quantity of the second electronic device is greater than or equal to a second electric quantity threshold, it may be also determined that the second electronic device is the charging party, but if charging is performed subsequently, a charging effect may be not ideal.). Otherwise, if neither of the both electronic devices is in a state of receiving power, the second electronic device is an electronic device whose output power is larger, and a residual electric quantity value of the second electronic device is less than the first electric quantity threshold, the entire process is terminated (it should be noted that, in this case, it may be also determined that the electronic device is the charging parry, and the reason is the same as that described above);

4) when only the electronic device is in a state of receiving power, and the second electronic device is an electronic device whose output power is larger, the entire process is terminated (it should be noted that, in this case, it may be also determined that the electronic device is the charging party, but if charging is begun subsequently, a charging effect may be not ideal.). Otherwise, if only the second electronic device is in a state of receiving power, and the electronic device is an electronic device whose output power is larger, the entire process is terminated (it should be noted that, in this case, it may be also determined that the second electronic device is the charging party, and the reason is the same as that described above); or 5) when the both electronic devices are in a state of receiving power, the entire process is terminated.

Exemplarily, the electronic device uses charging status information of the both electronic devices as a start determining condition. If the both electronic devices are in a state of receiving power, the entire process is ended. If neither of the both electronic devices is in a state of receiving power, the electronic device then determines according to output power information and residual electric quantity information of the both electronic devices that an electronic device of the both electronic devices whose output power is larger and whose residual electric quantity value is greater than or equal to an electric quantity threshold (that is, a first electric quantity threshold or a second electric quantity threshold) is the charging party. If only the electronic device is in a state of receiving power, it is then determined, when it is determined according to output power information of the both electronic devices that the electronic device is an electronic device whose output power is larger, that the electronic device serves as the charging party. If only the second electronic device is in a state of receiving power, it is then determined, when it is determined according to output power information of the both electronic devices that the second electronic device is an electronic device whose output power is larger, that the second electronic device serves as the charging party.

Exemplarily, the electronic device uses output power information of the both electronic devices as a start determining condition. If the electronic device is an electronic device whose output power is larger, it is then determined according to charging status information and/or residual electric quantity information of the both electronic devices as follows:

1) when neither of the both electronic devices is in a state of receiving power and a residual electric quantity value of the electronic device is greater than or equal to a first electric quantity threshold, or when the electronic device is in a state of receiving power and the second electronic device is not in the state of receiving power, it is determined that the electronic device is the charging party;

2) when the electronic device is not in a state of receiving power and the second electronic device is in the state of receiving power, or when neither of the both electronic devices is in a state of receiving power and a residual electric quantity value of the electronic device is less than a first electric quantity threshold, the entire process is terminated (it should be noted that, in this case, it may be also determined that the second electronic device is the charging party, but if charging is begun subsequently, a charging effect may be not ideal); or 3) when the both electronic devices are in a state of receiving power, the entire process is terminated.

If the second electronic device is an electronic device whose output power is larger, it is then determined according to charging status information and/or residual electric quantity information of the both electronic devices as follows:

1) when neither of the both electronic devices is in a state of receiving power and a residual electric quantity value of the second electronic device is greater than or equal to a second electric quantity threshold, or when the second electronic device is in a state of receiving power and the electronic device is not in a state of receiving power, it is determined that the second electronic device is the charging party;

2) when the second electronic device is not in a state of receiving power and the electronic device is in the state of receiving power, or when neither of the both electronic devices is in a state of receiving power and a residual electric quantity value of the second electronic device is less than a first electric quantity threshold, the entire process is terminated (it should be noted that, in this case, it may be also determined that the electronic device is the charging party, but if charging is begun subsequently, a charging effect may be not ideal); or 3) when the both electronic devices are in a state of receiving power, the entire process is terminated. If the electronic device and the second electronic device are electronic devices whose output powers are equivalent (that is, when output power levels of the both parties are the same, or an absolute value of a difference between output power values of the both parties is less than a power difference threshold), the entire process is terminated.

If output powers of the both electronic devices are equivalent, that is, output power levels of the both electronic devices are the same and/or an absolute value of a difference between output powers of the both electronic devices is less than a preset power difference threshold, the entire process may end, or it may be then determined according to charging status information and/or residual electric quantity information of the both electronic devices whether the electronic device or the second electronic device serves as the charging party, a specific determining method is the same as those in the foregoing two exemplified cases, and details are not described herein again.

Exemplarily, the electronic device uses residual electric quantity information of the both electronic devices as a start determining condition. If a residual electric quantity value of the electronic device is greater than or equal to a first electric quantity threshold and a residual electric quantity value of the second electronic device is greater than or equal to a second electric quantity threshold, it is then determined according to output power information and charging status information of the both electronic devices as follows:

1) when a peer electronic device of an electronic device whose output power is larger is not in a state of receiving power, it is determined that an electronic device of the both electronic devices whose output power is larger is the charging parry; or 2) when a peer electronic device of an electronic device whose output power is larger is in a state of receiving power, the entire process is terminated.

If a residual electric quantity value of the electronic device is less than a first electric quantity threshold and a residual electric quantity value of the second electronic device is less than a second electric quantity threshold, it is then determined according to output power information and charging status information of the both electronic devices as follows:

1) an electronic device of the both electronic devices whose output power is larger is the charging party when the electronic device is in a state of receiving power and a peer electronic device is not in the state of receiving power; or 2) when an electronic device whose output power is larger is not in a state of receiving power, or a peer device of an electronic device whose output power is larger is in a state of receiving power, the entire process is terminated.

If a residual electric quantity value of the electronic device is greater than or equal to a first electric quantity threshold and a residual electric quantity value of the second electronic device is less than a second electric quantity threshold, it is then determined according to output power information and charging status information of the both electronic devices as follows:

1) when the electronic device is an electronic device whose output power is larger and the second electronic device is not in a state of receiving power, it is determined that the electronic device is the charging party;

2) when the second electronic device is an electronic device whose output power is larger and only the second electronic device is in a state of receiving power, it is determined that the second electronic device is the charging party;

3) when the electronic device is an electronic device whose output power is larger and the second electronic device is in a state of receiving power, the entire process is terminated; or 4) when the second electronic device is an electronic device whose output power is larger, and the second electronic device is not in a state of receiving power or the electronic device is in a state of receiving power, the entire process is terminated.

If a residual electric quantity value of the electronic device is less than a first electric quantity threshold and a residual electric quantity value of the second electronic device is greater than or equal to a second electric quantity threshold, it is then determined according to output power information and charging status information of the both electronic devices as follows:

1) when the second electronic device is an electronic device whose output power is larger and the electronic device is not in a state of receiving power, it is determined that the second electronic device is the charging party; or 2) when the electronic device is an electronic device whose output power is larger and only the electronic device is in a state of receiving power, it is determined that the electronic device is the charging party;

3) when the second electronic device is an electronic device whose output power is larger and the electronic device is in a state of receiving power, the entire process is terminated; or 4) when the electronic device is an electronic device whose output power is larger, and the electronic device is not in a state of receiving power or the second electronic device is in a state of receiving power, the entire process is terminated.

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the electronic device may first perform determining according to the charging status information of the both electronic devices, or may first perform determining according to the output power information of the both electronic devices, or may first perform determining according to the residual electric quantity information of the both electronic devices, and a determining sequence of the information is not limited in this manner.

Further, an electronic device that is already determined to be the charging party enables an NFC wireless charging service of the electronic device to prepare to provide a charging service to a peer electronic device.

It should be noted that, a conventional NFC wireless charging process includes an NFC wireless charging control phase and an NFC wireless electric energy transmission phase; therefore, after a charging electronic device enables an NFC wireless charging service, the charging electronic device begins the NFC wireless charging process by using NFC communication, exchanges verification information, technical information and the like with a to-be-charged electronic device by using the NFC wireless charging control phase to select an NFC wireless charging manner or other wireless charging manners, and then charges the to-be-charged electronic device by using the NFC wireless charging electric energy transmission phase.

Additionally, the foregoing other wireless charging manners include but are not limited to wireless charging technologies separately formulated by three current major wireless charging alliances: WPC (Wireless Power Consortium), PMA (Power Matters Alliance) and A4WP (Alliance for Wireless Power).

By using the foregoing electronic device, the electronic device determines whether a charging party is the electronic device or a second electronic device according to charging reference information, and when it is determined that the charging party is the electronic device, the electronic device enables an NFC wireless charging service of the electronic device, or when it is determined that the charging party is the second electronic device, the electronic device instructs the second electronic device to enable an NFC wireless charging service. In this way, when the electronic device and the second electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

Figure 6:
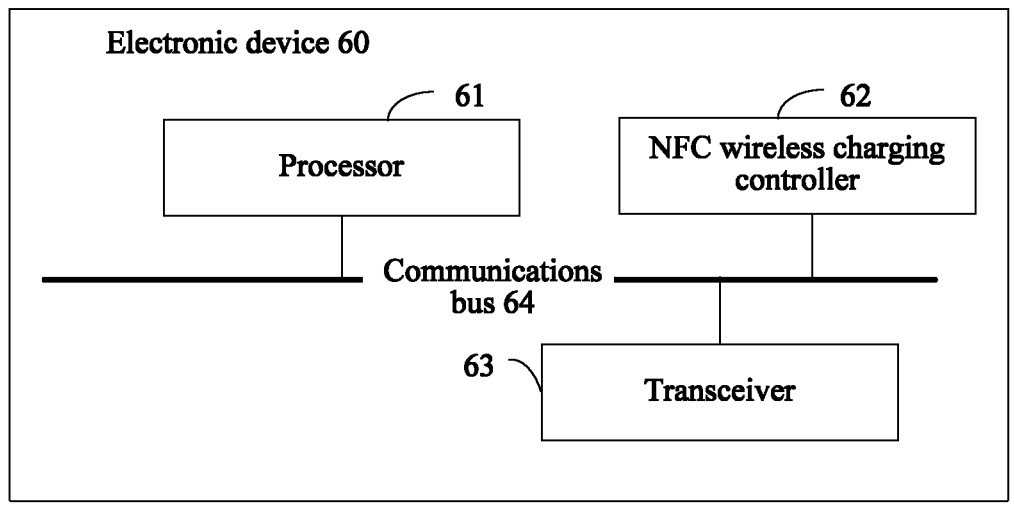
FIG. 6 is a schematic structural diagram of another electronic device according to an embodiment of the present invention.

An embodiment of the present invention provides another electronic device 60, and as shown in FIG. 6, the electronic device 60 includes:

a processor 61, an NFC wireless charging controller 62, a transceiver 63 and a communications bus 64, where the processor 61, the NFC wireless charging controller 62 and the transceiver 63 complete mutual communication by using the communications bus 64.

The processor 61 may be a multi-core central processing unit CPU, or an application specific integrated circuit ASIC (Application Specific Integrated Circuit), or one or more integrated circuits configured to implement this embodiment of the present invention.

The transceiver 63 is configured to receive a notification sent by a first electronic device when the first electronic device determines that the electronic device is a charging party; the processor 61 is configured to control the NFC wireless charging controller 62 according to the notification, so as to enable an NFC wireless charging service of the electronic device; and the NFC wireless charging controller 62 is configured to enable the NFC wireless charging service according to control of the processor, so as to prepare to charge the first electronic device.

Alternatively, the transceiver 63 is configured to receive a charging control message sent by the first electronic device when the first electronic device determines that the first electronic device is a charging party; and the processor 61 is configured to instruct, according to the charging control message, the electronic device to respond as a charged party.

It should be noted that, in specific implementation, the NFC wireless charging controller 62 may be used as an individual module and be disposed separate from the processor 61, or may be used as a part of the processor 61 and be integrated inside the processor 61.

Optionally, the transceiver 63 is further configured to: before the notification is received or the charging control message is received, send at least one piece of charging status information of the electronic device, output power information of the electronic device and residual electric quantity information of the electronic device to the first electronic device; or receive a request message of the first electronic device, and send at least one piece of charging status information of the electronic device, output power information of the electronic device and residual electric quantity information of the electronic device to the first electronic device according to the request message of the first electronic device.

Optionally, the processor 61 is further configured to: before the transceiver 63 sends at least one piece of the charging status information of the electronic device, the output power information of the electronic device and the residual electric quantity information of the electronic device to the first electronic device, determine that the electronic device and the first electronic device are kept within an effective distance of NFC communication and a time in which no NFC communication occurs between the both electronic devices exceeds a preset time threshold.

It may be clearly understood by a person skilled in the art that, for the purpose of convenient and brief description, for a detailed working process and description of the foregoing electronic device, refer to a corresponding process in the foregoing method embodiments, and details are not described herein again.

By using the foregoing electronic device, the electronic device receives a notification sent by a first electronic device when the first electronic device determines that the electronic device is a charging party, and enables an NFC wireless charging service of the electronic device according to the notification, so as to prepare to charge the first electronic device. Or, the electronic device receives a charging control message sent by the first electronic device when the first electronic device determines that the first electronic device serves as the charging party, so as to instruct the electronic device to respond as a charged party. In this way, when the first electronic device and the electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

Figure 7:
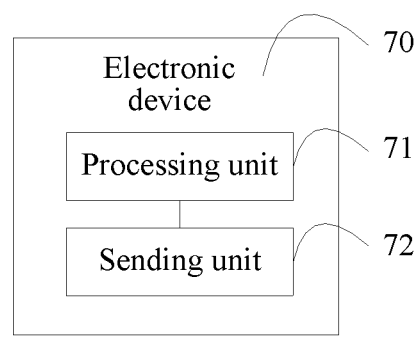
FIG. 7 is a schematic structural diagram of another electronic device according to an embodiment of the present invention.

An embodiment of the present invention provides another electronic device 70, and as shown in FIG. 7, the electronic device 70 includes:

a processing unit 71, configured to determine whether a charging party is the electronic device or a second electronic device according to charging reference information, and when it is determined that the charging party is the electronic device, enable an NFC wireless charging service of the electronic device, so as to prepare to charge the second electronic device; and a sending unit 72, configured to: when the processing unit 71 determines that the charging party is the second electronic device, instruct the second electronic device to enable an NFC wireless charging service, so as to prepare to charge the electronic device.

It should be noted that, the electronic device may be a mobile phone, a tablet computer, a notebook computer or the like, the second electronic device may be a Bluetooth headset, a pedometer, a mobile phone or the like, and both the electronic device and the second electronic device have an NFC communication function.

Optionally, the processing unit 71 is further configured to: before it is determined whether the charging party is the electronic device or the second electronic device according to the charging reference information, determine that the electronic device and the second electronic device are kept within an effective distance of NFC communication and a time in which no NFC communication occurs between the both electronic devices exceeds a preset time threshold.

Additionally, the charging reference information includes information actively sent by the second electronic device to the electronic device or information sent by the second electronic device to the electronic device according to a request message of the electronic device. The electronic device may obtain the charging reference information by sending the request message for multiple times or at one time, which is not limited in the present invention.

If information included in the charging reference information differs, a manner in which the processing unit 71 determines whether the electronic device is the charging party or the second electronic device is the charging party also differs, and includes:

Manner 1: The charging reference information includes: charging status information of the electronic device and charging status information of the second electronic device.

Then, the electronic device makes determining according to the charging reference information as follows:

1) When the electronic device is not in a state of receiving power and the second electronic device is in the state of receiving power, it is determined that the second electronic device is the charging party;

2) When the electronic device is in a state of receiving power and the second electronic device is not in the state of receiving power, it is determined that the electronic device is the charging party;

3) When the electronic device is not in a state of receiving power and the second electronic device is not in the state of receiving power, it may be randomly determined whether the electronic device or the second electronic device is the charging party, or the entire process may end, or it may be determined by obtaining output power information, residual electric quantity information and the like of the electronic device and the second electronic device whether the electronic device or the second electronic device serves as the charging party (for details, refer to the following related implementation manner); or 4) When the electronic device is in a state of receiving power and the second electronic device is in the state of receiving power, the entire process is terminated.

Specifically, the charging status information includes a charging identifier that is used for denoting whether a corresponding electronic device is in a state of receiving power, and then when one electronic device is in the state of receiving power, and the other electronic device is not in the state of receiving power, the electronic device determines that an electronic device being in the state of receiving power is the charging party, and enables an NFC wireless charging service of the charging party, so as to prepare to charge the peer electronic device. When neither of the both electronic devices is in the state of receiving power, the electronic device may randomly determine that one electronic device is the charging party, or it may be determined by obtaining output power information, residual electric quantity information and the like of the electronic device and the second electronic device whether the electronic device or the second electronic device serves as the charging party (for details, refer to the following related implementation manner). When the both electronic devices are in the state of receiving power, the entire process is terminated.

Manner 2: The charging reference information includes: output power information of the electronic device.

Then, the electronic device makes determining according to the charging reference information as follows:

1) When an output power value of the electronic device is greater than or equal to a preset power threshold, or an output power level is higher than or equal to a preset power level, it is determined that the electronic device is the charging party; or 2) When an output power of the electronic device is less than a preset power threshold, it may be determined that the second electronic device is the charging party, or it may be determined by obtaining an output power of the second electronic device and/or charging status information of the both parties and/or residual electric quantity information of the both parties whether the electronic device or the second electronic device serves as the charging party (for details, refer to the following related implementation manner).

Specifically, the output power information may include an output power value, and then the preset power threshold is a threshold value that is preset according to an actual situation; and the output power information may include an output power level, and then the preset power level is a threshold level that is preset according to an actual situation. For example, when the output power of the electronic device is sufficiently large (for example, the electronic device is a high-power device), the electronic device may be the charging party by default.

Manner 3: The charging reference information includes: output power information of the electronic device and output power information of the second electronic device.

Then, the electronic device makes determining according to the charging reference information as follows:

1) When the electronic device is an electronic device whose output power is larger, it is determined that the electronic device is the charging party;

2) When the second electronic device is an electronic device whose output power is larger, it is determined that the second electronic device is the charging party; or 3) When the electronic device and the second electronic device are electronic devices whose output powers are equivalent, it may be randomly determined that one electronic device is the charging party, or the entire process may end, or it may be determined by obtaining charging status information of the both electronic devices and/or residual electric quantity information of the electronic device or the both electronic devices whether the electronic device or the second electronic device serves as the charging party (for details, refer to the following related implementation manner).

Specifically, the output power information may include output power levels, such as a high level, an intermediate level, and a low level, and in this case, the electronic device determines an electronic device whose output power is larger by comparing output power levels of the both electronic devices, and determines that the electronic device whose output power is larger is the charging party, for example, when the output power levels of the both electronic devices at least differ by one level, an electronic device whose level is large is the electronic device whose output power is larger; and the output power information may also include an output power value, and in this case, when determining that a difference between output power values of the both electronic devices is greater than a preset power difference threshold, the electronic device determines that an electronic device whose output power value is larger is the charging party, for example, an output power value of the electronic device and an output power value of the second electronic device are P1 and P2 respectively, and the preset power difference threshold is $\Delta P$, and therefore if $P1>P2$ and $|P1-P2|>\Delta P$, the electronic device is the electronic device whose output power is larger.

It should be noted that, the output power information may include both an output power level and an output power value, and then when output power levels of the both electronic devices are the same, the electronic device may determine the electronic device whose output power is larger by using the foregoing method, that is, by comparing the difference between the output power values of the both electronic devices with the preset power difference threshold. Additionally, the electronic device may indirectly obtain the output power value by obtaining an output current and an output voltage.

Manner 4: The charging reference information includes: output power information of the electronic device, charging status information of the electronic device and/or charging status information of the second electronic device.

Then, the electronic device makes determining according to the charging reference information as follows:

1) when an output power value of the electronic device is greater than or equal to a preset power threshold, or an output power level is higher than or equal to a preset power level, and the electronic device is in a state of receiving power and/or the second electronic device is not in the state of receiving power, it is determined that the electronic device is the charging party;

2) when an output power value of the electronic device is greater than or equal to a preset power threshold, or an output power level is higher than or equal to a preset power level, and the second electronic device is in a state of receiving power, it may be determined that the second electronic device is the charging party, or the entire process may end;

3) when an output power value of the electronic device is less than a preset power threshold, or an output power level is lower than a preset power level, and the electronic device is not in a state of receiving power, it may be determined that the second electronic device is the charging party, or the process may end, or it may be determined by obtaining output power information of the second electronic device and/or residual electric quantity information of the both electronic devices whether the electronic device or the second electronic device serves as the charging party (for details, refer to other implementation manner); or 4) when an output power value of the electronic device is less than a preset power threshold, or an output power level is lower than a preset power level, and the electronic device is in a state of receiving power, it may be determined that the electronic device is the charging party, or the process may end.

It should be noted that, functions of the charging status information, the output power information, the preset power threshold, and the preset power level that are described in this manner are the same as those in other related implementation manners described above, and details are not described herein again. Additionally, the electronic device may first perform determining according to the output power information, or may first perform determining according to the charging status information of the both electronic devices, and a determining sequence of the information is not limited in this manner.

Manner 5: The charging reference information includes: output power information of the electronic device, output power information of the second electronic device, charging status information of the electronic device and charging status information of the second electronic device.

Then, the electronic device makes determining according to the charging reference information as follows:

1) when the electronic device is an electronic device whose output power is larger and the second electronic device is not in a state of receiving power, it is determined that the electronic device is the charging party;

2) when the electronic device is an electronic device whose output power is larger and the second electronic device is in a state of receiving power, it may be determined that the second electronic device is the charging party, or the entire process may end;

3) when the second electronic device is an electronic device whose output power is larger and the electronic device is not in a state of receiving power, it is determined that the second electronic device is the charging party; or 4) when the second electronic device is an electronic device whose output power is larger and the electronic device is in a state of receiving power, it may be determined that the electronic device is the charging party, or the entire process may end.

It should be noted that, functions of the charging status information and the output power information that are described in this manner are the same as those in other related implementation manners described above, and details are not described herein again. For a method for determining the electronic device whose output power is larger, refer to specific description in Manner 3 described above, and details are not described herein again. Additionally, the electronic device may first perform determining according to the output power information of the both electronic devices, or may first perform determining according to the charging status information of the both electronic devices, and a determining sequence of the information is not limited in this manner.

Manner 6: The charging reference information includes: charging status information of the electronic device, charging status information of the second electronic device and residual electric quantity information of the electronic device.

Then, the electronic device makes determining according to the charging reference information as follows:

1) when a residual electric quantity value of the electronic device is greater than or equal to a first electric quantity threshold, and the second electronic device is not in a state of receiving power, it is determined that the electronic device is the charging party;

2) when a residual electric quantity value of the electronic device is greater than or equal to a first electric quantity threshold, and the second electronic device is in a state of receiving power, it may be determined that the second electronic device is the charging party, or the entire process may end;

3) when a residual electric quantity value of the electronic device is less than a first electric quantity threshold, and the electronic device is in a state of receiving power, it may be determined that the electronic device is the charging party, or the entire process may end; or 4) when a residual electric quantity value of the electronic device is less than a first electric quantity threshold, and the electronic device is not in a state of receiving power, it may be determined that the second electronic device is the charging party, or the entire process may end.

Specifically, the first electric quantity threshold may be a preset electric quantity threshold, or an electric quantity threshold that is set by the electronic device according to residual electric quantity information of the both electronic devices after the first electronic device obtains residual electric quantity information of the second electronic device.

Exemplarily, the electronic device sends a battery information request to the second electronic device, and receives a battery information response that is sent by the second electronic device according to the battery information request, where the battery information request is used for learning residual electric quantity information of a battery of the second electronic device, and then the electronic device determines the first electric quantity threshold according to the residual electric quantity information of the both electronic devices.

It should be noted that, the residual electric quantity information includes a residual electric quantity value and/or a total battery quantity, and/or a residual electric quantity percentage and a total battery quantity, and the residual electric quantity information may further include a charging demand indication and/or other related parameters such as a maximum or threshold discharging current.

Exemplarily, a residual electric quantity value of the electronic device is 500 mAh, a minimum electric quantity value affecting normal usage of a device is 300 mAh, and if after sending a battery information request to the second electronic device, the electronic device determines according to a battery information response sent by the second electronic device that a total battery quantity of the second electronic device is 150 mAh, and a residual electric quantity value of the second electronic device is 10 mAh, the electronic device may set a first electric quantity threshold that can charge the second electronic device, such as, 400 mAh. If the electronic device determines that the total battery quantity of the second electronic device is 2000 mAh, the residual electric quantity value of the second electronic device is 100 mAh, and a maximum discharging current of the second electronic device is 2 A, after the electronic device charges the second electronic device by an electric quantity of 200 mAh, an estimated normal usage time of the second electronic device is about 10 minutes, and in this case, the electronic device may set a first electric quantity threshold of 500 mAh for the second electronic device.

It should be noted that, a function of the charging status information that is described in this manner is the same as those in other related implementation manners described above, and details are not described herein again. Additionally, the electronic device may first perform determining according to the residual electric quantity information of the electronic device, or may first perform determining according to the charging status information of the both electronic devices, and a determining sequence of the information is not limited in this manner.

Manner 7: The charging reference information includes: output power information of the electronic device and residual electric quantity information of the electronic device.

Then, the electronic device makes determining according to the charging reference information as follows:

1) when an output power value of the electronic device is greater than or equal to a preset power threshold, or an output power level is higher than or equal to a preset power level, and a residual electric quantity value of the electronic device is greater than or equal to a first electric quantity threshold, it is determined that the electronic device is the charging party;

2) when an output power value of the electronic device is greater than or equal to a preset power threshold, or an output power level is higher than or equal to a preset power level, and a residual electric quantity value of the electronic device is less than a first electric quantity threshold, it may be determined that the second electronic device is the charging party, or the entire process may end, or it may be determined by obtaining charging statuses of the both electronic devices and/or a residual electric quantity of the second electronic device and/or output power information of the second electronic device whether the electronic device or the second electronic device serves as the charging party (for details, refer to other related implementation manner);

3) when an output power value of the electronic device is less than a preset power threshold, or an output power level is lower than a preset power level, and a residual electric quantity value of the electronic device is greater than or equal to a first electric quantity threshold, it may be determined that the electronic device is the charging party, or the entire process may end, or it may be determined by obtaining charging statuses of the both electronic devices and/or a residual electric quantity of the second electronic device and/or output power information of the second electronic device whether the electronic device or the second electronic device serves as the charging party (for details, refer to other related implementation manner); or 4) when an output power value of the electronic device is less than a preset power threshold, or an output power level is lower than a preset power level, and a residual electric quantity value of the electronic device is less than a first electric quantity threshold, it may be determined that the second electronic device is the charging party, or the entire process may end, or it may be determined by obtaining charging statuses of the both electronic devices and/or a residual electric quantity of the second electronic device and/or output power information of the second electronic device whether the electronic device or the second electronic device serves as the charging party (for details, refer to other related implementation manner).

It should be noted that, functions of the output power information, the preset power threshold, the preset power level, the residual electric quantity information, the first electric quantity threshold, and the charging status information that are described in this manner are the same as those in other related implementation manners described above, and details are not described herein again. Additionally, the electronic device may first perform determining according to the output power information of the electronic devices, or may first perform determining according to the residual electric quantity information of the electronic devices, and a determining sequence of the information is not limited in this manner.

Manner 8: The charging reference information includes: output power information of the second electronic device, output power information of the electronic device and residual electric quantity information of the electronic device.

Then, the electronic device makes determining according to the charging reference information as follows:

1) when the electronic device is an electronic device whose output power is larger and a residual electric quantity value of the electronic device is greater than or equal to a first electric quantity threshold, it is determined that the electronic device is the charging party;

2) when the second electronic device is an electronic device whose output power is larger and a residual electric quantity value of the electronic device is less than a first electric quantity threshold, it is determined that the second electronic device is the charging party;

3) when the electronic device is an electronic device whose output power is larger and a residual electric quantity of the electronic device is less than a first electric quantity threshold, it may be determined that the second electronic device is the charging party, or the entire process may end, or it may be determined by obtaining charging status information of the both parties and/or residual electric quantity information of the second electronic device whether the electronic device or the second electronic device serves as the charging party (for details, refer to other related implementation manner); or 4) when the second electronic device is an electronic device whose output power is larger and a residual electric quantity of the electronic device is greater than a first electric quantity threshold, it may be determined that the electronic device is the charging party, or the entire process may end, or it may be determined by obtaining charging status information of the both parties and/or residual electric quantity information of the second electronic device whether the electronic device or the second electronic device serves as the charging party (for details, refer to other related implementation manner).

It should be noted that, functions of the output power information, the residual electric quantity information, the first electric quantity threshold, and the charging status information that are described in this manner are the same as those in other related implementation manners described above, and details are not described herein again. Additionally, the electronic device may first perform determining according to the output power information of the both electronic devices, or may first perform determining according to the residual electric quantity information of the electronic devices, and a determining sequence of the information is not limited in this manner.

Manner 9: The charging reference information includes: output power information of the electronic device, output power information of the second electronic device, residual electric quantity information of the electronic device and residual electric quantity information of the second electronic device.

Then, the electronic device makes determining according to the charging reference information as follows:

1) when the electronic device is an electronic device whose output power is larger and a residual electric quantity value of the electronic device is greater than or equal to a first electric quantity threshold, it is determined that the electronic device is the charging party;

2) when the second electronic device is an electronic device whose output power is larger and a residual electric quantity value of the second electronic device is greater than or equal to a second electric quantity threshold, it is determined that the second electronic device is the charging party;

3) when the second electronic device is an electronic device whose output power is larger, a residual electric quantity value of the electronic device is greater than or equal to a first electric quantity threshold and a residual electric quantity of the second electronic device is less than a second electric quantity threshold, it may be determined that the electronic device is the charging party, or the entire process may end, or it may be determined by obtaining charging status information of the both parties whether the electronic device or the second electronic device serves as the charging party (for details, refer to other related implementation manner);

4) when the electronic device is an electronic device whose output power is larger, a residual electric quantity value of the electronic device is less than a first electric quantity threshold and a residual electric quantity of the second electronic device is greater than or equal to a second electric quantity threshold, it may be determined that the second electronic device is the charging party, or the entire process may end, or it may be determined by obtaining charging status information of the both parties whether the electronic device or the second electronic device serves as the charging party (for details, refer to other related implementation manner); or 5) in other cases, the entire process may end, or it may be determined by obtaining charging status information of the both parties whether the electronic device or the second electronic device serves as the charging party (for details, refer to other related implementation manner).

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the electronic device may first perform determining according to the output power information of the both electronic devices, or may first perform determining according to the residual electric quantity information of the both electronic devices, and a determining sequence of the information is not limited in this manner.

Manner 10: The charging reference information includes: charging status information of the electronic device, charging status information of the second electronic device, output power information of the electronic device, residual electric quantity information of the electronic device and/or residual electric quantity information of the second electronic device.

Then, the electronic device makes determining according to the charging reference information as follows:

1) when an output power value of the electronic device is greater than or equal to a preset power threshold, or an output power level is higher than or equal to a preset power level, the both electronic devices are not in a state of receiving power, and a residual electric quantity of the electronic device is greater than or equal to a first electric quantity threshold, and/or a residual electric quantity of the second electronic device is less than a second electric quantity threshold, it is determined that the electronic device is the charging party;

2) when an output power value of the electronic device is greater than or equal to a preset power threshold, or an output power level is higher than or equal to a preset power level, the both electronic devices are not in a state of receiving power, and a residual electric quantity of the electronic device is less than a first electric quantity threshold, and/or a residual electric quantity of the second electronic device is greater than or equal to a second electric quantity threshold, it may be determined that the second electronic device is the charging party, or the entire process may end;

3) when an output power value of the electronic device is greater than or equal to a preset power threshold, or an output power level is higher than or equal to a preset power level, and only the electronic device is in a state of receiving power, it is determined that the electronic device is the charging party;

4) when an output power value of the electronic device is greater than or equal to a preset power threshold, or an output power level is higher than or equal to a preset power level, and only the second electronic device is in a state of receiving power, it may be determined that the second electronic device is the charging party, or the entire process may end;

5) when an output power value of the electronic device is less than a preset power threshold, or an output power level is lower than or equal to a preset power level, the both electronic devices are not in a state of receiving power, and a residual electric quantity of the electronic device is greater than or equal to a first electric quantity threshold, and/or a residual electric quantity of the second electronic device is less than a second electric quantity threshold, it may be determined that the electronic device is the charging party, or the entire process may end;

6) when an output power value of the electronic device is less than a preset power threshold, or an output power level is lower than or equal to a preset power level, the both electronic devices are not in a state of receiving power, and a residual electric quantity of the electronic device is less than a first electric quantity threshold, and/or a residual electric quantity of the second electronic device is greater than or equal to a second electric quantity threshold, it may be determined that the second electronic device is the charging party, or the entire process may end;

7) when an output power value of the electronic device is less than a preset power threshold, or an output power level is lower than a preset power level, and only the electronic device is in a state of receiving power, it may be determined that the electronic device is the charging parry, or the entire process may end;

8) when an output power value of the electronic device is less than a preset power threshold, or an output power level is lower than a preset power level, and only the second electronic device is in a state of receiving power, it may be determined that the electronic device is the charging party, or the entire process may end; or 9) when the both electronic devices are in a state of receiving an electric quantity, the entire process is terminated.

Exemplarily, the electronic device uses output power information of the electronic devices as a start determining condition. If the output power value of the electronic device is greater than or equal to the preset power threshold, or the output power level is higher than or equal to the preset power level, determining is performed according to the charging status information and/or the residual electric quantity information of the both electronic devices:

1) when the both electronic devices are in a state of receiving power, the entire process is terminated;

2) when neither of the both electronic devices is in a state of receiving power and a residual electric quantity value of the first electronic device is greater than or equal to a first electric quantity threshold, or only the electronic device is in a state of receiving power, it is determined that the electronic device is the charging party; or 3) when only the second electronic device is in a state of receiving power, the entire process is terminated (it should be noted that, in this case, it may be also determined that the second electronic device is the charging party, but if charging is begun subsequently, a charging effect may be not ideal).

If the output power value of the electronic device is less than the preset power threshold, or the output power level is lower than or equal to the preset power level, the entire process may end, or determining may be performed according to the charging status information and/or the residual electric quantity information of the both electronic devices:

1) when the both electronic devices are in a state of receiving power, the entire process is terminated;

2) when neither of the both electronic devices is in a state of receiving power, and a residual electric quantity value of the electronic device is less than a first electric quantity threshold, and/or a residual electric quantity value of the second electronic device is greater than or equal to a second electric quantity threshold, it may be determined that the second electronic device is the charging party, or the entire process may end;

3) when neither of the both electronic devices is in a state of receiving power, and a residual electric quantity value of the electronic device is greater than or equal to a first electric quantity threshold, and/or a residual electric quantity value of the second electronic device is less than a second electric quantity threshold, it may be determined that the electronic device is the charging party, or the entire process may end;

4) when only the electronic device is in a state of receiving power, it may be determined that the electronic device is the charging party, or the entire process may end; or 5) when only the second electronic device is in a state of receiving power, it may be determined that the electronic device is the charging party, or the entire process may end.

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the electronic device may first perform determining according to the charging status information of the both electronic devices, or may first perform determining according to the output power information of the electronic device, or may first perform determining according to the residual electric quantity information of the both electronic devices, and a determining sequence of the information is not limited in this manner.

Manner 11: The charging reference information includes: charging status information of the electronic device, charging status information of the second electronic device, output power information of the electronic device, output power information of the second electronic device, residual electric quantity information of the electronic device and/or residual electric quantity information of the second electronic device.

Then, the electronic device makes determining according to the charging reference information as follows:

1) when neither of the both electronic devices is in a state of receiving power, the electronic device is an electronic device whose output power is larger, and a residual electric quantity value of the electronic device is greater than or equal to a first electric quantity threshold, it is determined that the electronic device is the charging party; otherwise, if neither of the both electronic devices is in a state of receiving power, the second electronic device is an electronic device whose output power is larger, and a residual electric quantity value of the second electronic device is greater than or equal to a second electric quantity threshold, it is determined that the second electronic device is the charging party;

2) when only the electronic device is in a state of receiving power, and the electronic device is an electronic device whose output power is larger, it is determined that the electronic device is the charging party; otherwise, if only the second electronic device is in a state of receiving power, and the second electronic device is an electronic device whose output power is larger, it is determined that the second electronic device is the charging party;

3) when neither of the both electronic devices is in a state of receiving power, the electronic device is an electronic device whose output power is larger, and a residual electric quantity value of the electronic device is less than a first electric quantity threshold, the entire process is terminated (it should be noted that, in this case, if a residual electric quantity of the second electronic device is greater than or equal to a second electric quantity threshold, it may be also determined that the second electronic device is the charging party, but if charging is performed subsequently, a charging effect may be not ideal.). Otherwise, if neither of the both electronic devices is in a state of receiving power, the second electronic device is an electronic device whose output power is larger, and a residual electric quantity value of the second electronic device is less than the first electric quantity threshold, the entire process is terminated (it should be noted that, in this case, it may be also determined that the electronic device is the charging parry, and the reason is the same as that described above);

4) when only the electronic device is in a state of receiving power, and the second electronic device is an electronic device whose output power is larger, the entire process is terminated (it should be noted that, in this case, it may be also determined that the electronic device is the charging party, but if charging is begun subsequently, a charging effect may be not ideal.). Otherwise, if only the second electronic device is in a state of receiving power, and the electronic device is an electronic device whose output power is larger, the entire process is terminated (it should be noted that, in this case, it may be also determined that the second electronic device is the charging party, and the reason is the same as that described above); or 5) when the both electronic devices are in a state of receiving power, the entire process is terminated.

Exemplarily, the electronic device uses charging status information of the both electronic devices as a start determining condition. If the both electronic devices are in a state of receiving power, the entire process is ended. If neither of the both electronic devices is in a state of receiving power, the electronic device then determines according to output power information and residual electric quantity information of the both electronic devices that an electronic device of the both electronic devices whose output power is larger and whose residual electric quantity value is greater than or equal to an electric quantity threshold (that is, a first electric quantity threshold or a second electric quantity threshold) is the charging party. If only the electronic device is in a state of receiving power, it is then determined, when it is determined according to output power information of the both electronic devices that the electronic device is an electronic device whose output power is larger, that the electronic device serves as the charging party; or if only the second electronic device is in a state of receiving power, it is then determined, when it is determined according to output power information of the both electronic devices that the second electronic device is an electronic device whose output power is larger, that the second electronic device serves as the charging party.

Exemplarily, the electronic device uses output power information of the both electronic devices as a start determining condition. If the electronic device is an electronic device whose output power is larger, it is then determined according to charging status information and/or residual electric quantity information of the both electronic devices as follows:

1) when neither of the both electronic devices is in a state of receiving power and a residual electric quantity value of the electronic device is greater than or equal to a first electric quantity threshold, or when the electronic device is in a state of receiving power and the second electronic device is not in the state of receiving power, it is determined that the electronic device is the charging party;

2) when the electronic device is not in a state of receiving power and the second electronic device is in the state of receiving power, or when neither of the both electronic devices is in a state of receiving power and a residual electric quantity value of the electronic device is less than a first electric quantity threshold, the entire process is terminated (it should be noted that, in this case, it may be also determined that the second electronic device is the charging party, but if charging is begun subsequently, a charging effect may be not ideal); or 3) when the both electronic devices are in a state of receiving power, the entire process is terminated.

If the second electronic device is an electronic device whose output power is larger, it is then determined according to charging status information and/or residual electric quantity information of the both electronic devices as follows:

1) when neither of the both electronic devices is in a state of receiving power and a residual electric quantity value of the second electronic device is greater than or equal to a second electric quantity threshold, or when the second electronic device is in a state of receiving power and the electronic device is not in a state of receiving power, it is determined that the second electronic device is the charging party;

2) when the second electronic device is not in a state of receiving power and the electronic device is in the state of receiving power, or when neither of the both electronic devices is in a state of receiving power and a residual electric quantity value of the second electronic device is less than a first electric quantity threshold, the entire process is terminated (it should be noted that, in this case, it may be also determined that the electronic device is the charging party, but if charging is begun subsequently, a charging effect may be not ideal); or 3) when the both electronic devices are in a state of receiving power, the entire process is terminated. If the electronic device and the second electronic device are electronic devices whose output powers are equivalent (that is, when output power levels of the both parties are the same, or an absolute value of a difference between output power values of the both parties is less than a power difference threshold), the entire process is terminated.

If output powers of the both electronic devices are equivalent, that is, output power levels of the both electronic devices are the same and/or an absolute value of a difference between output powers of the both electronic devices is less than a preset power difference threshold, the entire process may end, or it may be then determined according to charging status information and/or residual electric quantity information of the both electronic devices whether the electronic device or the second electronic device serves as the charging party, a specific determining method is the same as those in the foregoing two exemplified cases, and details are not described herein again.

Exemplarily, the electronic device uses residual electric quantity information of the both electronic devices as a start determining condition. If a residual electric quantity value of the electronic device is greater than or equal to a first electric quantity threshold and a residual electric quantity value of the second electronic device is greater than or equal to a second electric quantity threshold, it is then determined according to output power information and charging status information of the both electronic devices as follows:

1) when a peer electronic device of an electronic device whose output power is larger is not in a state of receiving power, it is determined that an electronic device of the both electronic devices whose output power is larger is the charging parry; or 2) when a peer electronic device of an electronic device whose output power is larger is in a state of receiving power, the entire process is terminated.

If a residual electric quantity value of the electronic device is less than a first electric quantity threshold and a residual electric quantity value of the second electronic device is less than a second electric quantity threshold, it is then determined according to output power information and charging status information of the both electronic devices as follows:

1) an electronic device of the both electronic devices whose output power is larger is the charging party when the electronic device is in a state of receiving power and a peer electronic device is not in the state of receiving power; or 2) when an electronic device whose output power is larger is not in a state of receiving power, or a peer device of an electronic device whose output power is larger is in a state of receiving power, the entire process is terminated.

If a residual electric quantity value of the electronic device is greater than or equal to a first electric quantity threshold and a residual electric quantity value of the second electronic device is less than a second electric quantity threshold, it is then determined according to output power information and charging status information of the both electronic devices as follows:

1) when the electronic device is an electronic device whose output power is larger and the second electronic device is not in a state of receiving power, it is determined that the electronic device is the charging party;

2) when the second electronic device is an electronic device whose output power is larger and only the second electronic device is in a state of receiving power, it is determined that the second electronic device is the charging party;

3) when the electronic device is an electronic device whose output power is larger and the second electronic device is in a state of receiving power, the entire process is terminated; or 4) when the second electronic device is an electronic device whose output power is larger, and the second electronic device is not in a state of receiving power or the electronic device is in a state of receiving power, the entire process is terminated.

If a residual electric quantity value of the electronic device is less than a first electric quantity threshold and a residual electric quantity value of the second electronic device is greater than or equal to a second electric quantity threshold, it is then determined according to output power information and charging status information of the both electronic devices as follows:

1) when the second electronic device is an electronic device whose output power is larger and the electronic device is not in a state of receiving power, it is determined that the second electronic device is the charging party; or 2) when the electronic device is an electronic device whose output power is larger and only the electronic device is in a state of receiving power, it is determined that the electronic device is the charging party;

3) when the second electronic device is an electronic device whose output power is larger and the electronic device is in a state of receiving power, the entire process is terminated; or 4) when the electronic device is an electronic device whose output power is larger, and the electronic device is not in a state of receiving power or the second electronic device is in a state of receiving power, the entire process is terminated.

It should be noted that, functions of the output power information, the residual electric quantity information, the first electric quantity threshold, the second electric quantity threshold, and the charging status information that are described in this manner are the same as those in other related implementation manners described above, and details are not described herein again. The second electric quantity threshold is similar to the first electric quantity threshold, and may be preset, or may be set according to the residual electric quantity information of the both electronic devices. For a specific method, refer to specific description in Manner 6 described above, and details are not described herein again. Additionally, the electronic device may first perform determining according to the charging status information of the both electronic devices, or may first perform determining according to the output power information of the both electronic devices, or may first perform determining according to the residual electric quantity information of the both electronic devices, and a determining sequence of the information is not limited in this manner.

Further, an electronic device that is already determined to be the charging party enables an NFC wireless charging service of the electronic device to provide a charging service to a peer electronic device.

It should be noted that, a conventional NFC wireless charging process includes an NFC wireless charging control phase and an NFC wireless electric energy transmission phase. Therefore, after a charging electronic device enables an NFC wireless charging service, the charging electronic device begins the NFC wireless charging process by using NFC communication, exchanges verification information, technical information and the like with a to-be-charged electronic device by using the NFC wireless charging control phase to select an NFC wireless charging manner or other wireless charging manners, and then charges the to-be-charged electronic device by using the NFC wireless charging electric energy transmission phase.

Additionally, the foregoing other wireless charging manners include but are not limited to wireless charging technologies separately formulated by three current major wireless charging alliances: WPC (Wireless Power Consortium), PMA (Power Matters Alliance) and A4WP (Alliance for Wireless Power).

By using the foregoing electronic device, the electronic device determines whether a charging party is the electronic device or a second electronic device according to charging reference information, and when it is determined that the charging party is the electronic device, the electronic device enables an NFC wireless charging service of the electronic device, or when it is determined that the charging party is the second electronic device, the electronic device instructs the second electronic device to enable an NFC wireless charging service. In this way, when the electronic device and the second electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

Figure 8:
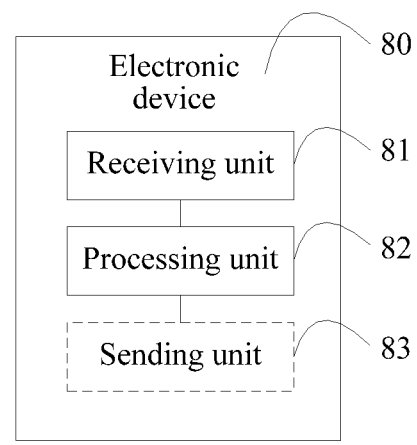
FIG. 8 is a schematic structural diagram of another electronic device according to an embodiment of the present invention.

An embodiment of the present invention provides another electronic device 80, and as shown in FIG. 8, the electronic device 80 includes:

a receiving unit 81, configured to receive a notification sent by a first electronic device when the first electronic device determines that the electronic device is a charging party; and a processing unit 82, configured to enable an NFC wireless charging service of the electronic device according to the notification received by the receiving unit 81, so as to prepare to charge the first electronic device.

Alternatively, the receiving unit 81 is configured to receive a charging control message sent by the first electronic device when the first electronic device determines that the first electronic device is a charging party; and the processing unit 82 is configured to instruct, according to the charging control message received by the receiving unit 81, the electronic device to respond as a charged party.

Optionally, the electronic device further includes a sending unit 83, where the sending unit 83 is configured to: before the receiving unit receives the notification or receives the charging control message, send at least one piece of charging status information of the electronic device, output power information of the electronic device and residual electric quantity information of the electronic device to the first electronic device; or receive a request message of the first electronic device, and send at least one piece of charging status information of the electronic device, output power information of the electronic device and residual electric quantity information of the electronic device to the first electronic device according to the request message of the first electronic device.

Optionally, the processing unit 82 is further configured to: before the sending unit 83 sends at least one piece of the charging status information of the electronic device, the output power information of the electronic device and the residual electric quantity information of the electronic device to the first electronic device, determine that the electronic device and the first electronic device are kept within an effective distance of NFC communication and a time in which no NFC communication occurs between the both electronic devices exceeds a preset time threshold.

By using the foregoing electronic device, the electronic device receives a notification sent by a first electronic device when the first electronic device determines that the electronic device is a charging party, and enables an NFC wireless charging service of the electronic device according to the notification, so as to prepare to charge the first electronic device; or the electronic device receives a charging control message sent by the first electronic device when the first electronic device determines that the first electronic device serves as the charging party, so as to instruct the electronic device to respond as a charged party. In this way, when the first electronic device and the electronic device are located within an effective range of NFC communication, the both electronic devices can determine the charging party according to the charging reference message and automatically enable the NFC wireless charging service of the charging party, which makes full use of more fragmented time to charge a peer electronic device, avoids time consumption and labor consumption caused due to an active operation of a user, and improves user experience.

It may be clearly understood by a person skilled in the art that, for the purpose of convenient and brief description, division of the foregoing function modules is taken as an example for illustration. In actual application, the foregoing functions can be allocated to different function modules and implemented according to a requirement, that is, an inner structure of an electronic device is divided into different function modules to implement all or part of the functions described above. For a detailed working process of the foregoing electronic device, refer to a corresponding process in the foregoing method embodiments, and details are not described herein again.

In the several embodiments provided in the present application, it should be understood that the disclosed electronic device may be implemented in other manners. For example, the described electronic device is merely exemplary. For example, the module or unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present application may be integrated into one processing unit, or each of the units may exist alone physically, or two or more units are integrated into one unit.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A method comprising:
    determining, by a first electronic device, whether a charging party is the first electronic device or a second electronic device according to charging reference information;
    enabling, in response to a determination that the charging party is the first electronic device, a near field communication (NFC) wireless charging service of the first electronic device, to prepare to charge the second electronic device; and
    instructing the second electronic device to enable an NFC wireless charging service in response to a determination that the charging party is the second electronic device, to prepare to charge the first electronic device.

2. The method according to claim 1, further comprising:
    determining that the first electronic device and the second electronic device are kept within an effective distance of NFC communication; and
    determining that a time in which no NFC communication occurs between the first electronic device and the second electronic device exceeds a preset time threshold.

3. The method according to claim 1, wherein the charging reference information comprises charging status information of the first electronic device and charging status information of the second electronic device, and wherein determining, by the first electronic device, whether the charging party is the first electronic device or the second electronic device comprises:
    determining that the second electronic device is the charging party in response to a determination that the first electronic device is not in a state of receiving power and a determination that the second electronic device is in the state of receiving power; or
    determining that the first electronic device is the charging party in response to a determination that the first electronic device is in a state of receiving power and a determination that the second electronic device is not in the state of receiving power.

4. The method according to claim 1, wherein the charging reference information comprises output power information of the first electronic device, charging status information of the first electronic device, and charging status information of the second electronic device, and wherein determining, by the first electronic device, whether the charging party is the first electronic device or the second electronic device comprises:
    determining that the first electronic device is the charging party in response to a determination that an output power value of the first electronic device is greater than or equal to a preset power threshold, a determination that the first electronic device is in a state of receiving power, and a determination that the second electronic device is not in the state of receiving power.

5. The method according to claim 1, wherein the charging reference information comprises output power information of the first electronic device and residual electric quantity information of the first electronic device, and wherein determining, by the first electronic device, whether the charging party is the first electronic device or the second electronic device comprises:
  determining that the first electronic device is the charging party in response to a determination that an output power value of the first electronic device is greater than or equal to a preset power threshold and a determination that a residual electric quantity value of the first electronic device is greater than or equal to a first electric quantity threshold, wherein the first electric quantity threshold comprises a preset electric quantity threshold or an electric quantity threshold that is set by the first electronic device according to residual electric quantity information of the first electronic device and the second electronic device.

6. The method according to claim 1, wherein the charging reference information comprises output power information of the first electronic device, output power information of the second electronic device, charging status information of the first electronic device, and charging status information of the second electronic device, and wherein determining, by the first electronic device, whether the charging party is the first electronic device or the second electronic device comprises:
  determining that the first electronic device is the charging party in response to a determination that an output power of the first electronic device is larger than an output power of the second electronic device, and a determination that the second electronic device is not in a state of receiving power; or
  determining that the second electronic device is the charging party in response to a determination that the output power of the second electronic device is larger than the output power of the first electronic device, and a determination that the first electronic device is not in a state of receiving power.

7. The method according to claim 6, wherein determining that the output power of the first electronic device is larger than the output power of the second electronic device comprises:
  determining that an output power level of the first electronic device is higher than an output power level of the second electronic device; or
  when an absolute difference between an output power value of the first electronic device and an output power value of the second electronic device is greater than or equal to a preset power difference threshold, determining that the output power value of the first electronic device is larger than the output power value of the second electronic device.

8. The method according to claim 1, wherein the charging reference information comprises output power information of the first electronic device, output power information of the second electronic device, residual electric quantity information of the first electronic device, and residual electric quantity information of the second electronic device, and
  wherein determining, by the first electronic device, whether the charging party is the first electronic device or the second electronic device comprises:
    determining that the first electronic device is the charging party in response to a determination that an output power of the first electronic device is larger than an output power of the second electronic device, and a determination that a residual electric quantity value of the first electronic device is greater than or equal to a first electric quantity threshold; or
    determining that the second electronic device is the charging party in response to a determination that the output power of the second electronic device is larger than the output power of the first electronic device, and a determination that a residual electric quantity value of the second electronic device is greater than or equal to a second electric quantity threshold, wherein the first electric quantity threshold comprises a preset electric quantity threshold or an electric quantity threshold that is set by the first electronic device according to residual electric quantity information of the first electronic device and the second electronic device, and wherein the second electric quantity threshold comprises a preset electric quantity threshold or an electric quantity threshold that is set by the first electronic device according to residual electric quantity information of the first electronic device and the second electronic device.

9. The method according to claim 1, wherein the charging reference information comprises charging status information of the first electronic device, charging status information of the second electronic device, output power information of the first electronic device, output power information of the second electronic device, and at least one of residual electric quantity information of the first electronic device or residual electric quantity information of the second electronic device, and wherein determining, by the first electronic device, whether the charging party is the first electronic device or the second electronic device comprises:
  determining that the first electronic device is the charging party in response to a determination that neither the first electronic device nor the second electronic device is in a state of receiving power, a determination that an output power of the first electronic device is larger than an output power of the second electronic device, and a determination that a residual electric quantity value of the first electronic device is greater than or equal to a first electric quantity threshold;
  determining that the first electronic device is the charging party in response to a determination that the first electronic device, and not the second electronic device, is in a state of receiving power and a determination that the output power of the first electronic device is larger than the output power of the second electronic device;
  determining that the second electronic device is the charging party in response to a determination that neither the first electronic device nor the second electronic device is in a state of receiving power, a determination that the output power of the second electronic device larger than the output power of the first electronic device, and a determination that a residual electric quantity value of the second electronic device is greater than or equal to a second electric quantity threshold; or
  determining that the second electronic device is the charging party in response to a determination that the second electronic device, and not the first electronic device, is in a state of receiving power and a determination that the output power of the second electronic device is larger than the output power of the first electronic device,
  wherein the first electric quantity threshold comprises a preset electric quantity threshold or an electric quantity threshold that is set by the first electronic device according to residual electric quantity information of the first electronic device and the second electronic device, and wherein the second electric quantity threshold comprises a preset electric quantity threshold or an electric quantity threshold that is set by the first electronic device according to residual electric quantity information of the first electronic device and the second electronic device.

10. A first electronic device, comprising:
a processor;
a near field communication (NFC) wireless charging controller;
a transceiver; and
a non-transitory computer-readable storage medium storing a program to be executed by the processor, the program including instructions for:
determining whether the first electronic device is a charging party or a second electronic device is a charging party according to charging reference information;
controlling the NFC wireless charging controller to enable an NFC wireless charging service in response to a determination that the first electronic device is the charging party, to prepare to charge the second electronic device; and
controlling a transceiver to send a notification to the second electronic device in response to a determination that the second electronic device is the charging party,
wherein the NFC wireless charging controller is configured to enable the NFC wireless charging service according to control of the processor, to prepare to charge the second electronic device, and
wherein the transceiver is configured to send the notification to the second electronic device according to control of the processor, so that the second electronic device enables an NFC wireless charging service of the second electronic device according to the notification and prepares to charge the first electronic device.

11. The first electronic device according to claim 10, wherein the program further includes instructions for determining that the first electronic device and the second electronic device are kept within an effective distance of NFC communication and a time in which no NFC communication occurs between the first electronic device and the second electronic device exceeds a preset time threshold.

12. The first electronic device according to claim 10, wherein the charging reference information comprises charging status information of the first electronic device and charging status information of the second electronic device, and wherein the program includes instructions for:
determining that the second electronic device is the charging party in response to a determination that the first electronic device is not in a state of receiving power and a determination that the second electronic device is in the state of receiving power; or
determining that the first electronic device is the charging party in response to a determination that the first electronic device is in a state of receiving power and a determination that the second electronic device is not in the state of receiving power.

13. The first electronic device according to claim 10, wherein the charging reference information comprises output power information of the first electronic device, charging status information of the first electronic device, and charging status information of the second electronic device, and wherein the program includes instructions for:
determining that the first electronic device is the charging party in response to a determination that an output power value of the first electronic device is greater than or equal to a preset power threshold, a determination that the first electronic device is in a state of receiving power, and a determination that the second electronic device is not in the state of receiving power.

14. The first electronic device according to claim 10, wherein the charging reference information comprises output power information of the first electronic device and residual electric quantity information of the first electronic device, and wherein the program includes instructions for:
determining that the first electronic device is the charging party in response to a determination that an output power value of the first electronic device is greater than or equal to a preset power threshold, and a determination that a residual electric quantity value of the first electronic device is greater than or equal to a first electric quantity threshold,
wherein the first electric quantity threshold comprises a preset electric quantity threshold or an electric quantity threshold that is set by the first electronic device according to residual electric quantity information of the first electronic device and the second electronic device.

15. The first electronic device according to claim 10, wherein the charging reference information comprises output power information of the first electronic device, output power information of the second electronic device, charging status information of the first electronic device, and charging status information of the second electronic device, and wherein the program includes instructions for:
determining that the first electronic device is the charging party in response to a determination that an output power of the first electronic device is larger than an output power of the second electronic device, and a determination that the second electronic device is not in a state of receiving power; or
determining that the second electronic device is the charging party in response to a determination that the output power of the second electronic device is larger than the output power of the first electronic device, and a determination that the first electronic device is not in a state of receiving power.

16. The first electronic device according to claim 10, wherein the charging reference information comprises output power information of the first electronic device, output power information of the second electronic device, residual electric quantity information of the first electronic device, and residual electric quantity information of the second electronic device, and wherein the program includes instructions for:
determining that the first electronic device is the charging party in response to a determination that an output power of the first electronic device is larger than an output power of the second electronic device, and a determination that a residual electric quantity value of the first electronic device is greater than or equal to a first electric quantity threshold; or
determining that the second electronic device is the charging party in response to a determination that the output power of the second electronic device is larger than the output power of the first electronic device, and a determination that a residual electric quantity value of the second electronic device is greater than or equal to a second electric quantity threshold,
wherein the first electric quantity threshold comprises a preset electric quantity threshold, or an electric quantity threshold that is set by the first electronic device according to residual electric quantity information of the first electronic device and the second electronic device, and wherein the second electric quantity threshold comprises a preset electric quantity threshold, or an electric quantity threshold that is set by the first electronic device according to residual electric quantity information of the first electronic device and the second electronic device.

17. The first electronic device according to claim 10, wherein the charging reference information comprises charging status information of the first electronic device, charging status information of the second electronic device, output power information of the first electronic device, output power information of the second electronic device, and at least one of residual electric quantity information of the first electronic device or residual electric quantity information of the second electronic device, and wherein the program includes instructions for:
  determining that the first electronic device is the charging party in response to a determination that neither the first electronic device nor the second electronic device is in a state of receiving power, a determination that an output power of the first electronic device is larger than an output power of the second electronic device, and a determination that a residual electric quantity value of the first electronic device is greater than or equal to a first electric quantity threshold;
  determining that the first electronic device is the charging party in response to a determination that the first electronic device, and not the second electronic device, is in a state of receiving power, and a determination that the output power of the first electronic device is larger than the output power of the second electronic device;
  determining that the second electronic device is the charging party in response to a determination that neither the first electronic device nor the second electronic device is in a state of receiving power, a determination that the output power of the second electronic device is larger than the output power of the first electronic device, and a determination that a residual electric quantity value of the second electronic device is greater than or equal to a second electric quantity threshold; or
  determining that the second electronic device is the charging party in response to a determination that the second electronic device, and not the first electronic device, is in a state of receiving power, and a determination that the output power of the second electronic device is larger than the output power of the first electronic device,
  wherein the first electric quantity threshold comprises a preset electric quantity threshold or an electric quantity threshold that is set by the first electronic device according to residual electric quantity information of the first electronic device and the second electronic device, and wherein the second electric quantity threshold comprises a preset electric quantity threshold or an electric quantity threshold that is set by the first electronic device according to residual electric quantity information of the first electronic device and the second electronic device.

18. A second electronic device, comprising:
  a transceiver configured to receive a notification sent by a first electronic device in response to the first electronic device determining that the second electronic device is a charging party;
  a near field communications (NFC) wireless charging controller; and
  a processor configured to control the NFC wireless charging controller according to the notification received by the transceiver, to enable an NFC wireless charging service of the second electronic device, wherein the NFC wireless charging controller is configured to enable the NFC wireless charging service according to control of the processor, to prepare to charge the first electronic device, wherein the transceiver is configured to receive a charging control message sent by the first electronic device in response to the first electronic device determining that the first electronic device is a charging party, and wherein the processor is configured to instruct, according to the charging control message received by the transceiver, the second electronic device to respond as a charged party.

19. The second electronic device according to claim 18, wherein the transceiver is further configured to:
  send, before the notification is received, at least one piece of charging status information of the second electronic device, output power information of the second electronic device, and residual electric quantity information of the second electronic device to the first electronic device; or receive, before the notification is received, a request message of the first electronic device, and send at least one piece of charging status information of the second electronic device, output power information of the second electronic device, and residual electric quantity information of the second electronic device to the first electronic device according to the request message of the first electronic device, and wherein the transceiver is further configured to:
  send, before the charging control message is received, at least one piece of charging status information of the second electronic device, output power information of the second electronic device and residual electric quantity information of the second electronic device to the first electronic device; or receive, before the charging control message is received, a request message of the first electronic device, and send at least one piece of charging status information of the second electronic device, output power information of the second electronic device, and residual electric quantity information of the second electronic device to the first electronic device according to the request message of the first electronic device.

20. The second electronic device according to claim 19, wherein the processor is further configured to determine that the second electronic device and the first electronic device are kept within an effective distance of NFC communication, and a time in which no NFC communication occurs between the first electronic device and the second electronic device exceeds a preset time threshold.

* * * * *

UNITED STATES PATENT AND TRADEMARK OFFICE
CERTIFICATE OF CORRECTION

PATENT NO. : 10,075,027 B2
APPLICATION NO. : 15/111770
DATED : September 11, 2018
INVENTOR(S) : Xiaona Zhao It is certified that error appears in the above-identified patent and that said Letters Patent is hereby corrected as shown below:

In Column 72, Line 49, Claim 9, delete "device larger" and insert --device is larger--.

Signed and Sealed this
Sixth Day of November, 2018

Andrei Iancu
*Director of the United States Patent and Trademark Office*